US005489359A

United States Patent [19]

Yamane

[11] Patent Number: 5,489,359

[45] Date of Patent: Feb. 6, 1996

[54] PRINTING METHOD FOR THERMALLY TRANSFERRING IMAGE SECTION OF PRINT SHEET TO IMAGE RECEIVING MEMBER AND PRINT SHEET MAKING DEVICE

[75] Inventor: Mitsuo Yamane, Yotsukaichi, Japan

[73] Assignee: Brother Kogyo Kabushiki Kaisha, Aichi, Japan

[21] Appl. No.: 262,764

[22] Filed: Jun. 20, 1994

Related U.S. Application Data

[62] Division of Ser. No. 65,884, May 21, 1993, Pat. No. 5,350,474, which is a division of Ser. No. 682,063, Apr. 8, 1991, Pat. No. 5,244,524.

[30] Foreign Application Priority Data

| | | | |
|---|---|---|---|
| Apr. 9, 1990 | [JP] | Japan | 2-93493 |
| Apr. 9, 1990 | [JP] | Japan | 2-93494 |
| Apr. 9, 1990 | [JP] | Japan | 2-93495 |
| Apr. 24, 1990 | [JP] | Japan | 2-108062 |
| Jun. 14, 1990 | [JP] | Japan | 2-155906 |
| Jun. 14, 1990 | [JP] | Japan | 2-155907 |
| Jun. 15, 1990 | [JP] | Japan | 2-158192 |
| Jun. 18, 1990 | [JP] | Japan | 2-159246 |
| Aug. 8, 1990 | [JP] | Japan | 2-210912 |

[51] Int. Cl.$^6$ .......... B32B 31/00

[52] U.S. Cl. .......... 156/540; 156/387; 156/230; 156/240

[58] Field of Search .......... 156/277, 387, 156/230, 540, 238, 239, 240; 428/40

[56] References Cited

U.S. PATENT DOCUMENTS

| | | | |
|---|---|---|---|
| 4,086,379 | 4/1978 | Brown | 428/40 |
| 4,171,398 | 10/1979 | Hunt | 156/240 X |
| 4,234,643 | 11/1980 | Grotefend et al. | 156/240 X |
| 4,564,411 | 1/1986 | Holzer | 156/387 |

FOREIGN PATENT DOCUMENTS

| | | |
|---|---|---|
| 0057940 | 10/1985 | European Pat. Off. . |
| 0094845 | 8/1988 | European Pat. Off. . |
| 2005596 | 4/1979 | United Kingdom . |
| 2210828 | 6/1989 | United Kingdom . |

*Primary Examiner*—James Engel

*Attorney, Agent, or Firm*—Kane, Dalsimer, Sullivan, Kurucz, Levy, Eisele and Richard

[57] ABSTRACT

A printing method includes an ink image forming step and an ink image retransferring step. In the ink image forming step, an ink image is formed on a hot melting type adhesive layer of a transfer sheet by using a heat-sensitive image transfer type recording device. In the image retransferring step, the ink image and the hot melting type adhesive layer are transferred onto an image receiving member such as a cloth by heatedly pressing the transfer sheet.

7 Claims, 17 Drawing Sheets

PRINTING METHOD FOR THERMALLY TRANSFERRING IMAGE SECTION OF PRINT SHEET TO IMAGE RECEIVING MEMBER AND PRINT SHEET MAKING DEVICE

This is a division of application Ser. No. 08/065,884 now U.S. Pat. No. 5,350,474, filed May 21, 1993, which is a divisional of Ser. No. 07/682,063 filed on Apr. 8, 1991 now U.S. Pat. No. 5,244,524.

BACKGROUND OF THE INVENTION

The present invention relates to a printing method for printing an image on an image receiving member such as cloth, paper and so on, and more particularly, to the printing method capable of easily printing any desired heat-sensitive transfer image formed on a transfer sheet onto the image receiving member by retransferring the image from the transfer sheet onto the receiving member. The present invention also relates to a print sheet making device in which the ink image is transferred to the transfer sheet.

Conventionally, in order to print images of characters and pictures on an image receiving member such as cloth, paper, wood, metal, plastic, ceramics and more particularly on wears and handkerchiefs, users may generally buy a ready-made print material such as a commercially produced applique to thermally print the image of the print material on the image receiving member by an iron, or the users may previously prepare a master plate to print the image on the receiving member by a screen printing method. Alternatively, users may ask for a speciality store to produce the print material. When user personally intends to print the characters and pictures those being not commercially produced on the material, printing process will become complicated, and printing cost will be extremely increased.

In order to resolve the above problem, a printing system using an electrostatic copying machine was proposed as described in Japanese Patent Application Kokai No. 60-230899. However, since the electrostatic copying machine used in this system is so remarkably expensive that users can not individually get this machine, users must go to the office or store in which this copy machine is set to make the print. In this connection, this system is not available for personal use.

Even if some user can easily use such copying machine, the thermal fixing process of this copying machine restricts the sheet on which a toner image is to be formed and fixed by this fixing process. For example, thermomelting type and thermosoftening type sheets will cause problems at the thermal fixing unit of the copy machine. These sheets will be softened or melted at a heating roller of the unit and adhered thereto or deformed by the pressure of the roller. Therefore the material of the sheet to be printed must be strictly selected.

In addition to the above problems, the copying machine always requires an original for printing the letters or picture images on the material to be printed. Particularly with respect to characters, required characters must be collected and rearranged in desired configuration by cutting and patching them for suitable layout, and the transferable image must be prepared by copying the arranged characters. This requires a complicated process.

SUMMARY OF THE INVENTION

With these problems in mind, it is a primary object of the invention to provide a printing method adapted for cloth, paper and so on in an easy manner. Particularly, the object of the invention is to provide a printing method capable of easily printing any desired print original such as characters and pictures on an image receiving member without any complicated process such as rearrangement of the print original and at a low cost.

These and other objects of the invention will be attained by providing a printing method for printing an image on an image receiving member comprising the steps of: transferring an ink image on a transfer sheet comprising a first hot-melting type adhesive layer to provide a print sheet, and retransferring the ink image and the first hot melting type adhesive layer onto the image receiving member by heatedly pressing the transfer sheet to thereby provide a final print on the receiving member.

According to the printing method of the invention, the heat-sensitive image transfer type recording device produces image data. An ink image is thermally transferred to a hot-melting type adhesive layer of a predetermined transfer sheet from a thermotransfer ribbon of the device in response to the image data made by the device. This transferred ink image formed on a print sheet is easily retransferred onto a material such as cloth by applying a heat and pressure to the rear surface of the transfer sheet opposite the ink image by means of heating and pressing means such as an iron.

In another aspect of the invention, there is provided a printing method for exclusively printing an imaging section onto an image receiving member comprising the steps of: preparing a transfer sheet comprising a hot melting type adhesive layer and another layer formed over the hot melting type adhesive layer, the another layer being capable of being perforated upon heating, the perforated portions corresponding to an intended imaging section for providing a perforated latent image, and heatedly pressing the transfer sheet on the image receiving member for melting the hot melting type adhesive layer and for allowing the melted hot melting type adhesive layer to flow through the perforated portion. With this method, only the imaging section can be provided on the image receiving member.

In still another aspect of this invention, there is provided a print sheet making device for making an ink image on an elongated image recording medium, the device comprising: an inputting means for inputting characters or marks to be printed on the image receiving member, means for supplying the elongated image recording medium, and image forming means for forming a transferred image of the characters or marks on the image recording medium in response to the inputting means.

DETAILED DESCRIPTION OF THE PREFERRED EMBODIMENTS

A printing method according to a first embodiment of this invention will be described in detail with reference to FIGS. 1 through 5.

The printing method employs a heat-sensitive image transfer type recording device such as a heat-sensitive image transfer type printer, typewriter, word-processor, and the like which are widely used in recent years. With employing the device, any desired image can be transferred on a transfer sheet and the image on the transfer sheet can be thermally retransferred onto a receiving member such as cloth, paper, wood, metal, plastics, ceramic, and the like.

Figure 1:
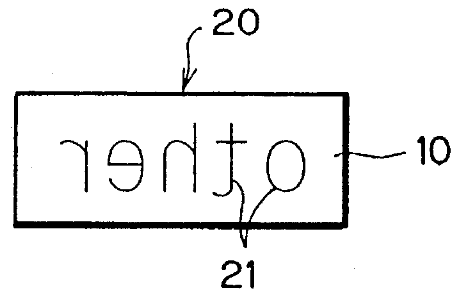
FIG. 1 is a front view showing one example of a print sheet in which the ink image is transferred onto a transfer sheet according to the present invention.

Referring first to FIG. 1, a transfer sheet 10 includes a base sheet 11 and a hot melting type adhesive layer 14. The base sheet 11 includes a base substrate 12 and a releasable layer 13 on which the hot melting type adhesive layer 14 is formed. Onto a surface of the hot melting type adhesive layer 14, a desired transferable ink image is thermally transferred in a real image or a mirror image by a heat-sensitive image transfer type device. More specifically, any desired characters or picture image is input into a heat-sensitive image transfer type recording device such as printer, type writer or word processor through a key board or a mouse of the recording device. The recording device has a thermal head 14 and a heater member 16. The heater member 16 generates heat in response to the input signal.

An ink ribbon 17 is positioned between the thermal head 15 and the hot melting type adhesive layer 14 of the transfer sheet 10, and the ribbon 17 is heated by the heating member 16 so that the ink image corresponding to the heated position of the ink ribbon 17 is transferred to the hot-melting type adhesive layer 14. For the ink ribbon 17 used to heat-sensitively transfer the ink image on the transfer sheet 10, ordinarily used ink ribbon mainly containing wax or resin ink can be used without any troubles. Thus desired transfer image can be formed on the transfer sheet 10.

In order to effectively form such thermally transferred image on the transfer sheet 10 by using the heat-sensitive image transfer type recording device, should be adjusted various factors of the recording device such as the position or configuration of the heating member 16 of the thermal head 15, the winding torque of the ink ribbon 17, the contact pressure of the thermal head 15 to the ink ribbon 17, the attachment angle of the thermal head 15, the energy supplied to the thermal head 15, the printing speed of the thermal head 15, and the like. Incidentally, FIG. 1 shows the thermal head type heat-sensitive image transfer recording device whose heating member 16 is composed of a plurality of resistors (heating elements) which are selectively supplied with electric power for selective heat generation. However, the invention can also employ an electric conducting type heat-sensitive image transfer recording device in which an electric conducting layer is set on the ink ribbon 17 and electric power is concentrically supplied to the desired point of the electric conducting layer through a needle electrode to heat the corresponding conductive layer for the image transfer.

The desired ink image thermally transferred on the hot-melting type adhesive layer 14 of the transfer sheet 10 is retransferred together with the hot-melting type adhesive layer 14 onto a final receiving member 30 by applying predetermined heat and pressure to the rear surface of the transfer sheet, i.e., to the base substrate 12. In this system, since the ink image and the hot-melting type adhesive layer must be finally remained on the receiving member, the base sheet 11 must be easily separated from the adhesive layer 14 regardless of the hot or cool state of the adhesive layer 14 after the retransfer step. In this respect, releasable or separable property between the base sheet 11 and the adhesive layer 14 must be properly adjusted.

The base sheet 11 of the transfer sheet 10 includes the film like substrate 12 such as paper, metal foil, plastic film or the like and the releasable layer 13 coated on one or both surfaces of the base substrate 12. The plastic film used for the base substrate 12 is made of a material selected from polyethylene terephthalate, polyethylene, polypropylene, polyamide, polyimide, fluoro resin, polyvinyl chloride, polysulfone, polycarbonate, ABS resin, and the like. Further, as more preferable mode for improving in heat resistance at the heating and pressing step, the invention may employ various laminated films including two plastic films, and a combination of paper film and metal foil. Further, an additional heat resistance layer can be incorporated into the base substrate 11.

For the releasable layer 13, well known releasable agent can be used, which is preferably selected from one or at least two of silicone resin, fluoro resin, polyolefin resin, and paraffin wax.

Thickness of the base sheet 11 of the transfer sheet 10 is preferably 20 micron meters to 250 micron meters, more preferably 25 micron meters to 150 micron meters in due consideration of convenience in handling, properties at the heat-sensitive transfer step, and easiness in separating the substrate 11 from the print section retransferred on the final receiving member after heating and pressing step.

Materials of the hot-melting type adhesive layer 14 coated on the base sheet 11 of the transfer sheet 10 must be selected in order to provide an ink-philic property which ensures a high quality ink image on the hot-melting type adhesive layer 14 without blur, blot, collapse and the like. Further, the adhesive layer 14 must provide high surface smoothness without any surface irregularities. Moreover, the hot melting-type adhesive layer 14 must be transparent so that the ink image is visible through the layer 14, since as described above the ink image as well as the layer 14 are finally formed over the receiving member 30, and the ink image is positioned below the layer 14 in the final image retransferred state.

Furthermore, the hot-melting type adhesive material must be selected in due consideration of factors which may affect a quality of the finally retransferred print image after heating and pressing step. These factors are the quality of image per se, touch and feeling, sense of incompatibility, brilliance, fastness against washing, fastness against light beam, fastness against sweat, fastness against dry-cleaning, and amount of free formaldehyde.

According to these factors, the hot-melting adhesive for the adhesive layer 14 can be selected from one or at least two of thermoplastic resins such as polyolefin resins, polyurethane, ethylene-vinylacetate copolymer, ethylene-ethylacrylate, ethylene-acrylic acid, ionomer, polyester, polyamide, acrylic resin, and so on.

At the heating and pressing step, the temperature of the heating means is 100° C. to 250° C. which range corresponds to the heating temperature of iron commonly used for house work. More preferably, the temperature should be limited to from 100° C. to 200° C. in consideration of safety in use, thermal resistance of the base sheet, applicability of the receiving member such as synthetic fibers and plastics to be transferred with the print image. The pressure of the pressing means is 10 g/cm$^2$ to 500 g/cm$^2$ depending on the pressure of the iron in family use, and preferably limited to from several twenty or thirty g/cm$^2$ to at maximum 200 to 300 g/cm$^2$. The period for the heating and pressing work is 5 to 30 sec. Thus the hot-melting type adhesive layer 14 must be made of a material so that the hot-melting type adhesive layer 14 can be softened and adhered to the receiving member under these conditions.

Figure 2:
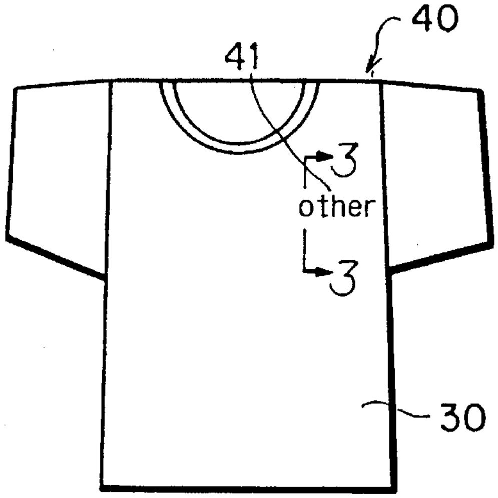
FIG. 2 is a front view showing the print image formed on the receiving member after heating and pressing step according to the present invention.

As described above, the transfer sheet 10 is formed with the any desired ink image transferred by the thermosensitive image transfer type recording device and then discharged from the device as a print sheet 20. As shown in FIG. 2, this print sheet 20 includes transferred ink characters or pictures 21 in a mirror image or a real image.

Figure 3:
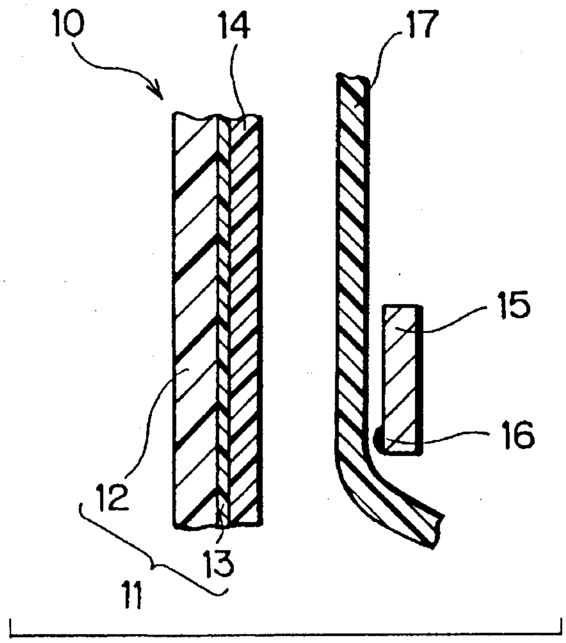
FIG. 3 is a cross-sectional view showing heat transfer process for transferring an ink image onto the transfer sheet according to a first embodiment of the present invention.
Figure 4:
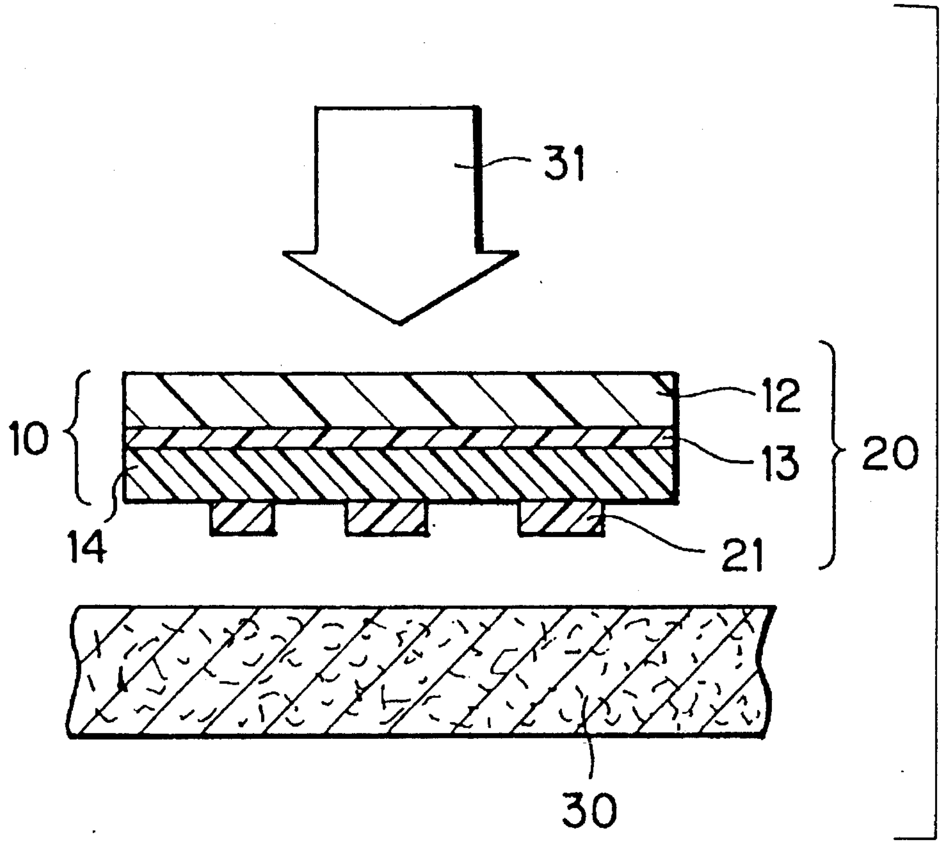
FIG. 4 is a schematic cross-sectional view showing image retransfer process for retransferring the ink image of the print sheet onto the receiving member by the application of heat and pressure according to the first embodiment of this invention.
Figure 5:
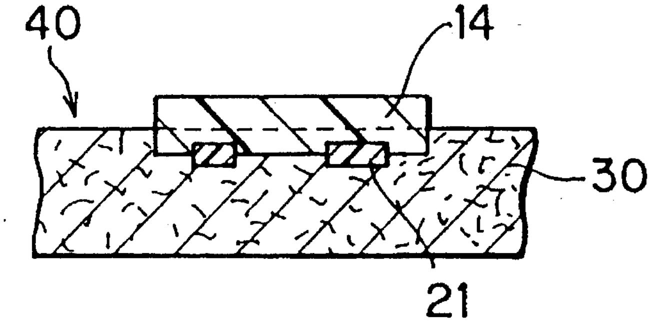
FIG. 5 is a cross-sectional view taken along the line A—A in FIG. 2 according to the first embodiment of this invention.

The print sheet 20 is set on the image receiving member 30 to be printed, as shown in FIG. 3, so as to face the ink image 21 to the print position of the member 30, and then the heating and pressing means 31 is applied to the rear surface of the sheet 20. The ink image 21 and the hot-melting type adhesive layer 14 are finally transferred to the print position by this heating and pressing transfer work. Then, the base substrate 12 of the transfer sheet 10 is removed from the hot melting type adhesive layer 14, so that the transferred print image 41 is visible. FIG. 4 shows one example of the printed product 40 with the print image 41, and FIG. 5 is a cross-sectional view of the printed product 40 in which the transferred print image 41 composed of the ink image 21 and the hot-melting type adhesive layer 14 is formed on the material 30 by heat and pressure. The ink image 21 is meltedly secured on the surface of the material 30 and in the textile thereof, and to the hot-melting type adhesive layer 14 which is also meltedly and strongly secured on the surface and in the textile of the receiving member 30.

Figure 6:
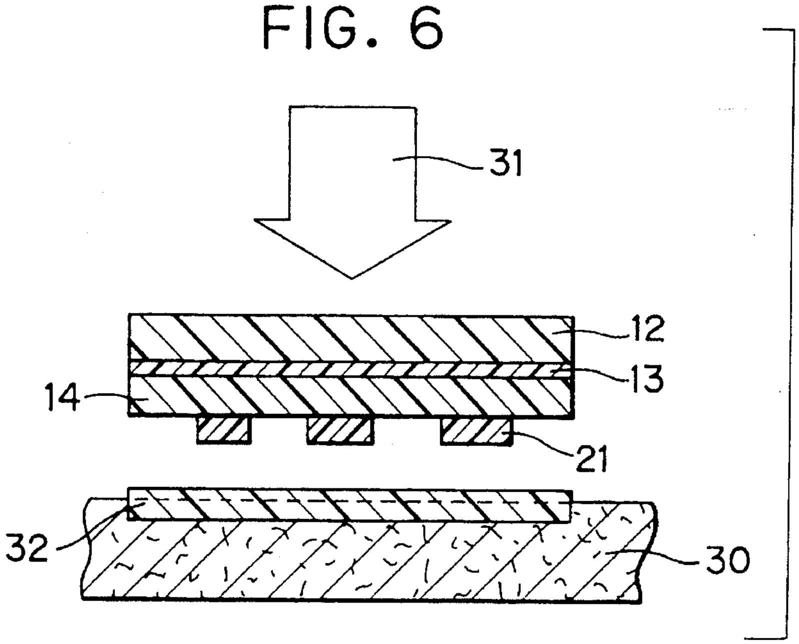
FIG. 6 is a schematic cross-sectional view showing image retransfer process for retransferring the ink image of the print sheet onto the receiving member by the application of heat and pressure according to a second embodiment of this invention.
Figure 7:
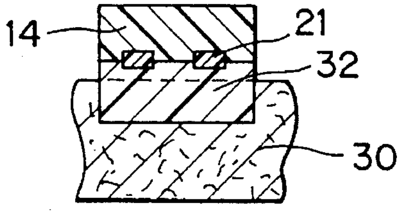
FIG. 7 is a cross-sectional view taken along the line A—A in FIG. 2 according to the second embodiment of this invention.

A printing method according to a second embodiment of this invention will next be described with reference to FIGS. 6 through 8, wherein like parts and components are designated by the same reference numerals and characters as those shown in the first embodiment. The second embodiment concerns improvement on the first embodiment. In the second embodiment,,as shown in FIG. 6, when the print sheet 20 in which the ink image 21 is formed on the transfer sheet 10 is placed on the image receiving member 30 and is heated and pressed for retransferring the inked image 21 as well as the hot melting type adhesive layer 14 onto the receiving member 30, another hot-melting type adhesive layer 32 is interposed between the image receiving member 30 and the inked image layer 21. Thus, the image section 21 is sandwiched between the two hot melting type adhesive layers 14 and 32 on the image receiving member 30.

The another hot melting type adhesive layer 32 is provisionally heated and pressed onto the image receiving member 30 prior to the heating and pressing process for the print sheet 20. Alternatively, the another hot melting type adhesive layer 32 can be merely placed directly on the image receiving member 30. Further alternatively, the another hot melting type adhesive layer 32 can be adhered to the image section 21 of the print sheet 20 by adhesive or viscous agent prior to the heating and pressing step for the print sheet (FIG. 8), or can be provided integral with the image section 21 by hot-melting treatment.

Materials of the another hot-melting type adhesive layer 32 positioned between the image section 21 and the image receiving member 30 must be selected in due consideration of fastness against washing, fastness against light beam, fastness against sweat, fastness against dry-cleaning, and amount of free formaldehyde. Further, similar to the hot melting type adhesive layer 14, the another hot melting type adhesive layer must be made of a material which is easily softened and adhered onto the image receiving member during heating and pressing process carried out under the condition described above with respect to the first embodiment.

According to these factors, the hot-melting adhesive material for the another adhesive layer 32 can be selected, similar to the material of the hot melting type adhesive layer 14, from one or at least two of thermoplastic resins such as polyolefin resins, polyurethane, ethylene-vinylacetate copolymer, ethylene-ethylacrylate, ethylene-acrylic acid, ionomer, polyester, polyamide, acrylic resin, and so on.

The ink section 21 is meltingly bonded to the hot melting type adhesive layers 14 and 32, and in some cases, the ink section can also be bonded to a surface of the receiving member and entered into textile thereof. The hot melting type adhesive layer 14 is tightly bonded with the other hot melting type adhesive layer 32 as shown in FIG. 7, and in some cases, the layer 14 can be bonded to the surface of the receiving member and entered into the textile thereof.

Figure 8:
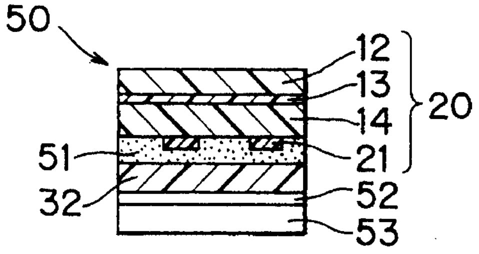
FIG. 8 is a cross-sectional view showing a print laminate sheet in which another hot melting type adhesive layer is provisionally bonded to the print sheet according to the second embodiment of this invention.

FIG. 8 shows one modification in the second embodiment. In the modification, the another hot melting type adhesive layer 32 is provisionally bonded to the print sheet 20 so as to constitute a print laminate sheet 50. That is, one surface of the another hot melting type adhesive layer 32 is bonded to the image section 21 by a viscous layer 51, and opposite surface of the other hot melting type adhesive layer 32 is formed with a releasable layer 52 to which a base layer 53 is bonded. For the image printing onto the image receiving member 30, the base layer 53 is removed from the releasable layer 52, and the remaining composite laminate sheet except the removed base layer 53 is placed on the image receiving member 30. Thereafter, heat and pressure is applied to the base substrate 12.

Thus, according to the second embodiment of this invention, the ink image section 21 on the hot melting type adhesive layer 14 is not directly printed on the image receiving layer but is printed through the other hot melting type adhesive layer 32 on the receiving member 30 (the image section 21 is laminated between the two hot melting type adhesive layers 14 and 32). Therefore, the imaging quality can be further improved and various resistivity such as resistance against washing can be enhanced, since the image section is not directly imparted with the surface condition of the image receiving member 30, and since the ink image section 21 can be fixedly held between the two layers 14 and 32.

Next, a printing method according to a third embodiment of this invention will be described with reference to FIGS. 9 through 11. The third embodiment pertains to an improvement on the first and second embodiments, and in the improvement, a color print can be effected on the receiving member 30 by providing a coloring layer in place of at least one of the hot melting type adhesive layers 14 and 32. Thus, a coloristic print image can be finally provided on the image receiving member 30 at low cost without any complexity.

For example, a hot melting type adhesive layer 14A shown in. FIG. 9 contains at least one kind of coloring agent selected from a group consisting of color dye, color paint or pigment, fluorescent dye, fluorescent paint, photo-storage paint, photo-storage dye, thermochromic material, photochromic material, electrochromic material, those being ordinarily available. Alternatively, an additional coloring layer containing the above described material can be coupled to the hot melting type adhesive layer 14A which also contains at least one of the coloring agents. Further alternatively, the additional coloring layer containing the above described material can be coupled to the hot melting type adhesive layer 14 which is described in the first or second embodiment.

The same is true with respect to the additional hot melting type adhesive layer 32A. That is, the layer 32A contains at least one kind of coloring agent selected from a group consisting of color dye, color paint or pigment, fluorescent dye, fluorescent paint, photo-storage paint, photo-storage dye, thermochromic material, photochromic material, electrochromic material, those being ordinarily available. Alternatively, an additional coloring layer containing the above described material can be coupled to the hot melting type adhesive layer 32A which also contains at least one of the coloring agents. Further alternatively, the additional coloring layer containing the above described material can be coupled to the other hot melting type adhesive layer 32 which is described in the second embodiment.

Figure 9:
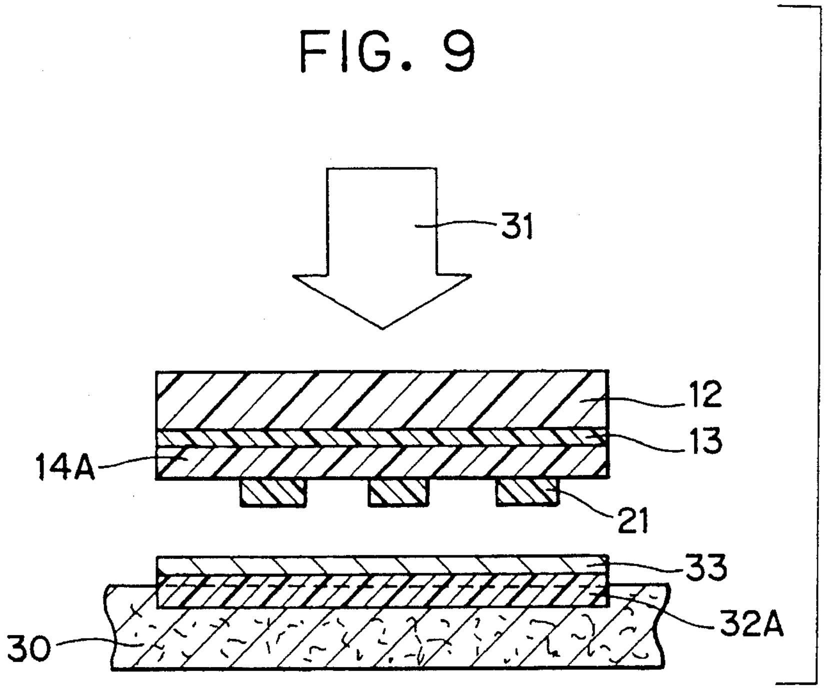
FIG. 9 is a schematic cross-sectional view showing image retransfer process for retransferring the ink image of the print sheet onto the receiving member by the application of heat and pressure according to a third embodiment of this invention.

FIG. 9 shows a heating and pressing step in the third embodiment. In this step, the coloring layer 33 is positioned on the other hot melting type adhesive layer 32A. However, the coloring layer 33 can be placed on the hot melting type adhesive layer 14A. With the arrangement, a print image 41 can be formed on a predetermined portion of the image receiving member 30 as shown in FIG. 2, in which the image section 21 is retransferred together with the hot melting type adhesive layer 14 onto the image receiving member 30, to thereby obtain an intended printed product 40.

Figure 10:
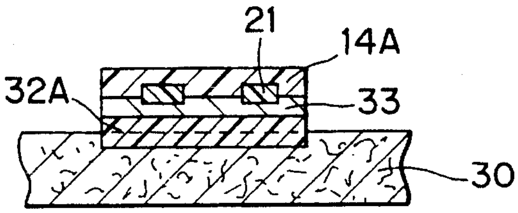
FIG. 10 is a cross-sectional view taken along the line A—A in FIG. 2 according to the third embodiment of this invention.

FIG. 10 is a cross-sectional view showing a print section formed onto the image receiving member 30 after the heating and pressing step, the image section including the hot melting type adhesive layer 32A, the coloring layer 33, the retransferred image section 21, and the hot melting type adhesive layer 14A. The ink image section 21 is meltingly bonded to the coloring layer 33 formed on the other hot melting type adhesive layer 32A and to the hot melting type adhesive layer 14A, and in some cases, the image section 22 can also meltedly bonded to the other hot melting type adhesive layer 32A and to the surface or textile of the image receiving member 30. The hot melting type adhesive layer 14A is tightly bonded to the coloring layer 33, and in some cases to the surface or textile of the image receiving member 30 as well as to the other hot melting type adhesive layer 32A through the coloring layer 33.

Figure 11:
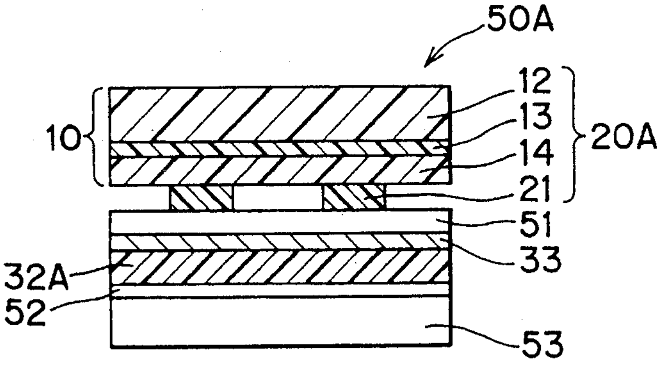
FIG. 11 is a cross-sectional view showing a print laminate sheet in which another hot melting type adhesive layer is provisionally bonded to the print sheet according to the third embodiment of this invention.

FIG. 11 shows one example of a print laminated sheet 50A in which a print sheet 20A containing the transfer sheet 10 and the image section 21 is bonded to one surface of the coloring layer 33 through a viscous layer 51. Opposite surface of the coloring layer 33 is bonded to the hot melting type adhesive layer 32A which is bonded to a base 53 through a releasable layer 52. For the image printing, the base 53 is removed from the releasable layer 52, and the remaining print laminated sheet 50A is placed on the image receiving member 30, and then heat and pressure is applied to the base substrate 12.

According to the third embodiment, the image section 21 is interposed between the hot melting type adhesive layers 14A and 32A, or between the adhesive layer 14A and the coloring layer 33. Therefore, imaging quality can be improved, and, various resistivity such as resistance against washing can be enhanced, since the image section is not directly imparted with the surface condition of the image receiving member 30, and since the ink image section 21 can be fixedly held between the two layers 14 and 32.

Further, in the third embodiment, coloring agents are dispersed in the hot melting type adhesive layer 14A and/or 32A, or the coloring layer is formed over the layer 14A and/or 32A. Therefore, resultant print can have beautiful and impressive image. For example, if the image receiving member 30 has deep dark color, distinct print image can be obtained if a while pigment is used in the coloring layer 33 or in the layers 14A and/or 32A. If the ordinarily available color dye or color pigment is used, various kinds of color print can be achieved. Further, if fluorescent dye, fluorescent pigment, photo-storage dye or photo-storage pigment, is used, fluorometric or luminous image can be provided in dark location. Furthermore, color of the print image can be changed dependent on temperature change if used is a metallic complex salt type, cholesteric liquid crystal type and leuco dye type thermochromic material.

A printing method according to a fourth embodiment of this invention will be described with reference to FIGS. 12 through 14. The fourth embodiment pertains to an improvement on the first through third embodiments. That is, in the fourth embodiment, after the hot melting type adhesive layer 14 or 14A and the image section 21 is transferred onto the image receiving member 30, a brushy layer is formed over the print sheet 20.

More specifically, the base substrate 12, the releasable layer 13 and the hot melting type adhesive layers 14, 14A and 32, 32A are the same as those of the foregoing embodiments. Further, heating and pressing conditions applied on to the print sheet 20 is the same as that of the foregoing embodiment. In accordance with the printing method described with reference to the first, second or third embodiment, the print image 41 is provided on the image receiving member 30 as shown in FIG. 2. In the print image 41, the image section 21 as well as the hot melting type adhesive layer 14 (14A) or, if any, the other hot melting type adhesive layer 32 (32A) are transferred to the image receiving member 30, and then as shown in FIG. 12, a brushy layer is formed over the print image section 41 so as to provide a brushy print image section 42. The brushy layer is placed on the print image section, and is heated and pressed, so that the brushy print image section 42 is provided, to thus provide a printed product 40A.

Figure 12:
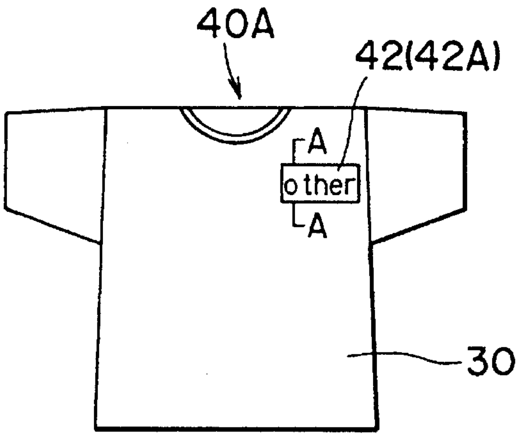
FIG. 12 is a front view showing a print image formed on the receiving member after heating and pressing step according to a fourth or fifth embodiment of the present invention.
Figure 13:
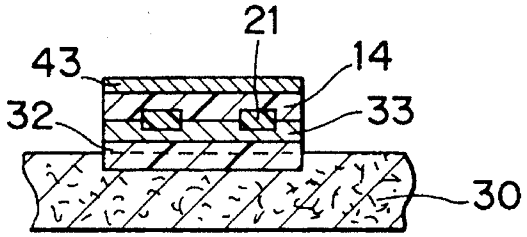
FIG. 13 is a cross-sectional view taken along a line A—A of FIG. 12.

FIG. 13 is a cross-sectional view showing resultant brushy print image section 42 and taken along a line A—A in FIG. 12. In FIG. 13, the brushy layer 42 is formed over the hot melting type adhesive layer 14, and resultant layers are the same as those of the third embodiment.

Figure 14:
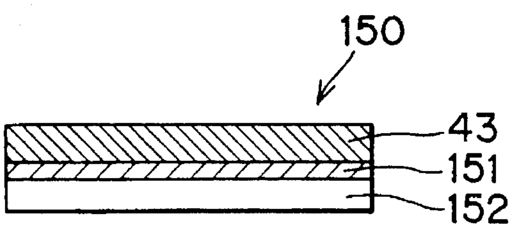
FIG. 14 is a cross-sectional view showing a brushy sheet used in the fourth embodiment.

FIG. 14 shows one example of a brushy sheet 150. The brushy sheet 150 includes the brushy layer 43, a brushy layer retaining layer 151 and a base 152. The brushy layer 43 is held on the base 152 through the retaining layer 151 with a weak adhesive force. The brushy layer 43 is formed of any fibrous material made of a material selected from the group of organic synthetic compound, inorganic material, natural material and metallic material. The thickness of the brushy layer is in a range of 1 micron meter to 5 mm. Various colors may be given to the brushy layer 43.

The retaining layer 151 is formed of any material capable of retaining the fibrous material. For example, thermosetting type adhesive, hot melting type adhesive, and thermoplastic resin and wax is available. The thickness of the retaining layer is in a range of from 1 to 200 micron meters. The base 52 is formed of a material selected from the group consisting of a paper, cloth, plastic sheet and metallic foil. The thickness of the base is in a rage of from 3 to 500 micron meters. The brushy sheet 150 is mounted on the hot melting type adhesive layer 14, and heat and pressure is applied to the base 152. Accordingly, the brushy layer 43 can be adhered to the hot melting type adhesive layer 14. Then, the base 152 and the retaining layer 151 are removed, so that only the brushy layer 43 can be implanted onto the hot melting type adhesive layer 14 or 14A, and resultant construction shown in FIG. 13 is obtainable.

Thus, the hot melting type adhesive layer 14 or 14A is not directly exposed to the atmosphere, but the brushy layer 43 covers the layer 14 or 14A. Since the brushy layer is provided over the hot melting type adhesive layer 14 or 14A, any sticky feeling which may be inherent to the hot melting type adhesive layer 14 or 14A can be eliminated, and improved feeling or fashion can be provided with good appearance.

Figure 15:
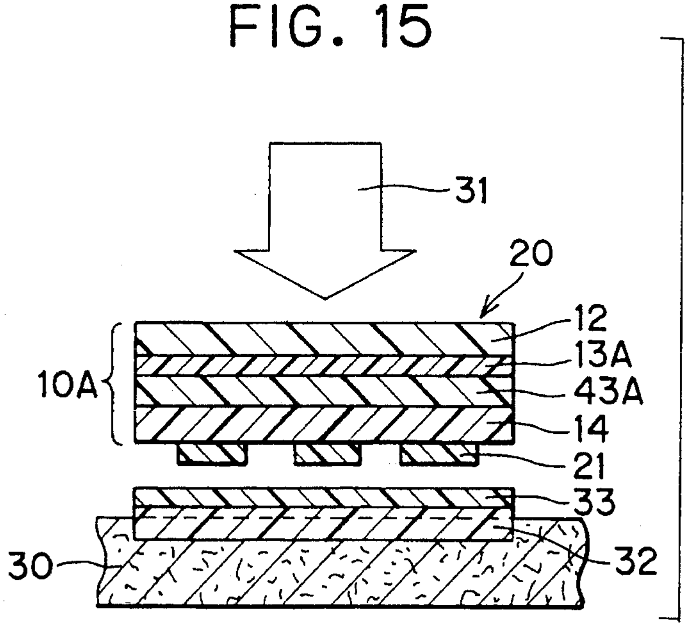
FIG. 15 is a schematic cross-sectional view showing image retransfer process for retransferring the ink image of a brushy print laminate sheet onto a receiving member by the application of heat and pressure according to a fifth embodiment of this invention.
Figure 16:
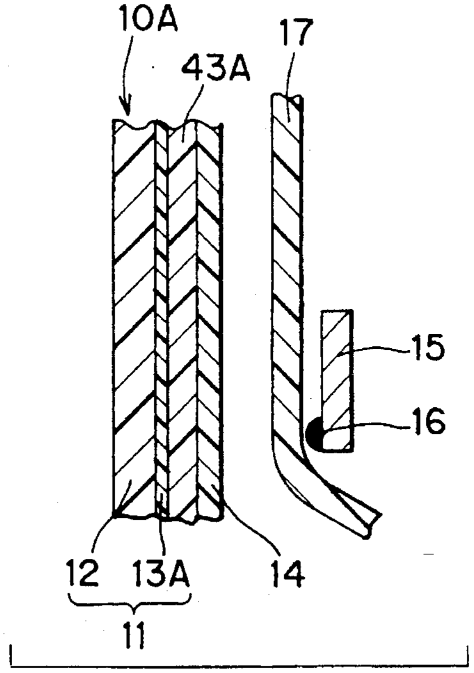
FIG. 16 is a cross-sectional view showing heat transfer process for transferring an ink image onto a transfer sheet according to a fifth embodiment of the present invention.

A printing method according to a fifth embodiment of this invention will next be described with reference to FIGS. 15 through 19. The fifth embodiment concerns an improvement on the fourth embodiment, in which the brushy layer is provisionally formed over the hot melting type adhesive layer 14 or 14A. That is, as shown in FIG. 15, a brushy transfer sheet 10A is formed with a transferred image 21 which is thermally transferred in a real image or mirror image fashion by means of heat sensitive transfer type recording device. More specifically, similar to the method described with reference to FIG. 3, as shown in FIG. 16, a heater 16 provided on a thermal head 15 is heated, and ink on an ink ribbon 17 is thermally transferred to a hot melting type adhesive layer 14 on the brushy transfer sheet 10A, the ink transferring portion corresponding to the heating position of-the heaters.

The brushy transfer sheet 10A includes a base substrate 12, a brushy layer retaining layer 13A formed on the base substrate 12, a brushy layer 43A formed on the retaining layer 13A and a hot melting type adhesive layer 14 formed on the brushy layer 43A. The image section 21 formed on the hot melting type adhesive layer 14 of the brushy transfer sheet 10A is retransferred on to the receiving member 30 together with the hot melting type adhesive layer 14 and with the brushy layer 43A by applying heat and pressure to the rear surface (base substrate 12) of the transfer sheet 10A similar to the second embodiment. In this case, as shown in FIG. 15, another hot melting type adhesive layer 32 can be provided between the image section 21 and the receiving member 30. Moreover, similar to the third embodiment, a coloring layer 33 can be provided between the image section 21 an the other hot melting type adhesive layer 32. Further in this case, the other hot melting type adhesive layer 32 can be provisionally heated and pressed onto the receiving member 30 or can be merely placed on the receiving member 30. Further alternatively, the other hot melting type adhesive layer 32 can be bonded to the image section 21 with adhesive or viscous agent, or by hot melting treatment.

The hot melting type adhesive layer 14 and a brush of the brushy layer 43A must be separable from the base substrate 12 even during a heated state immediately after the heating and pressing process (FIG. 15) and/or during the cooled state far after the heating and pressing process. In this connection separability between the base substrate and the brush material or between the base substrate and the hot melting type adhesive layer 14 must be properly adjusted.

The base substrate 12 of the brushy sheet 10A is formed of a film-like material such as paper, metallic foil and plastic film, and the brush retaining layer 13A is formed on one surface of the base substrate 12. The brush retaining layer 13A is provided with adhesive force relative to the brushy layer 43A smaller than the bonding force between the brushy layer 43A and the hot melting type adhesive layer 14 and smaller than the bonding force between the retaining layer 13A and the base substrate 12. With this change in adhesion force, the brush retaining layer 13A can also be separated from the brushy layer 43A when the base substrate 12 is peeled off from the brushy layer 43A.

The material of the plastic film is the same as that of the base substrate in the foregoing embodiments. Further, the material of the brush is the same as that of the fourth embodiment. Furthermore, the material of the hot melting type adhesive layer 14 is the same as that of the foregoing embodiments. The hot melting type adhesive layer 14 can be provided with a specific color in a manner similar to the fourth embodiment. Further, more, the other hot melting type adhesive layer 32 or 32A in the second or third embodiment can be positioned between the image section 21 and the receiving member 30, and heating and pressing condition is the same as that of the foregoing embodiments.

As shown in FIG. 15, the brushy print sheet 20 is positioned above the hot melting type adhesive layer 32 provided on the image receiving member 30 in such a manner that the image section 21 confronts the adhesive layer 32. Then, the heat and pressure 31 is applied to the base substrate 12. In this case, as shown in FIG. 15, a coloring layer 33 is provided on the hot melting type adhesive layer 32. However, the coloring layer 33 can be provided on the hot melting type adhesive layer 14, or can be dispensed with. Further, the other hot melting type adhesive layer 32 can be dispensed with.

Figure 17:
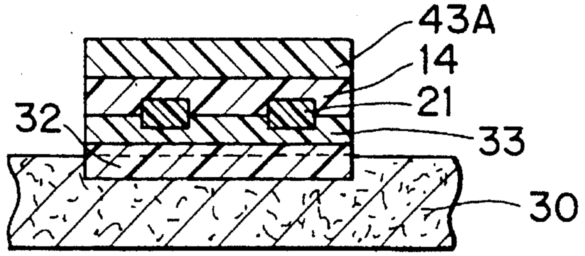
FIG. 17 is a cross-sectional view taken along a line A—A in FIG. 12.

By heating and pressing process, a brushy print section 42A can be provided on the image receiving member 30, the brushy print section including the image section 21, the hot melting type adhesive layers 14 and 32, and the brushy layer 43A. FIG. 17 is a cross-sectional view corresponding to the cross-section shown in FIG. 13. In FIG. 17, the image section 21 is meltedly bonded to the hot melting type adhesive layers 14 and 32 and to the coloring layer 33. The image section 21 is, in some cases, bonded to a surface and textile of the image receiving member 30. The hot melting type adhesive layer 14 is meltedly bonded to the other hot melting type adhesive layer 32 and to the coloring layer 33, and in some cases, the layer 14 is meltedly bonded to the surface and textile of the receiving member 30. The hot melting type adhesive layer 14 is covered with the brushy layer 43A. Thus similar to the fourth embodiment, the hot melting type adhesive layer 14 is not directly exposed to the atmosphere but is covered with the brushy layer. Therefore, feeling, fashion and external appearance can be improved without any sticky sense which may be inherent to the adhesive layer 14.

Figure 18:
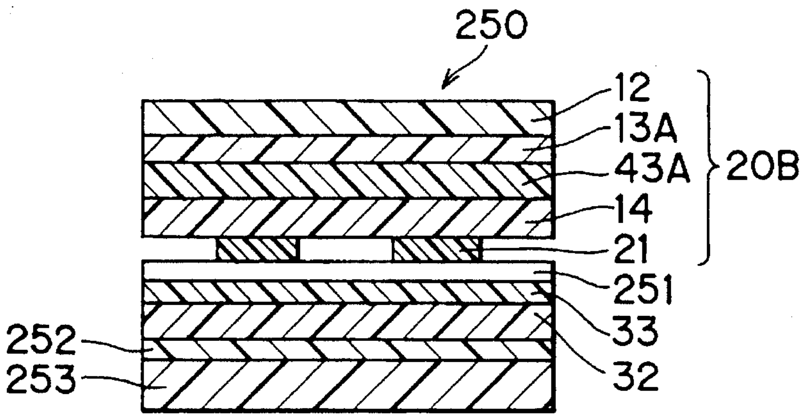
FIG. 18 is a cross-sectional view showing a print laminate sheet prior to the retransferring process according to the fifth embodiment of this invention.
Figure 19:
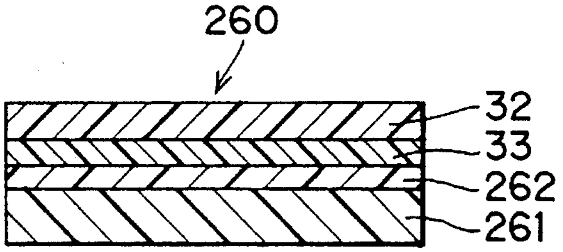
FIG. 19 is a cross-sectional view showing a transfer sheet including another hot melting type adhesive layer and a coloring layer according to the fifth embodiment of this invention.

FIG. 18 is a cross-sectional view showing one example of a print laminated sheet 250 according to the fifth embodiment. The print laminated sheet 250 includes the brushy print sheet 20B, a viscous layer 251 for bonding a coloring layer 33 to the image section 21, another hot melting type adhesive layer 32, a releasable layer 252 and a base 253. The base 253 is removed from the releasable layer 252, and remaining laminated sheet 250 is positioned on the image receiving member 30. FIG. 19 is a cross-sectional view showing one example of a lower portion 260 of the print laminated sheet 250. The lower portion 260 includes the other hot melting type adhesive layer 32, the coloring layer 33 positioned below the layer 32, a releasable layer 262 and a base 261. In the latter embodiment, the coloring layer 33 is positioned below the other hot melting type adhesive layer 33.

According to the fifth embodiment of this invention, the brushy print image section can be provided by a single heating and pressing process. Therefore, desirable brushy print image can be easily and promptly provided without any complexity. In other words, an operator can easily form a transferred image section 21 onto the predetermined brushy transfer sheet 10A in order to produce the brushy print sheet by using a heat transfer type image recording device.

Figure 20:
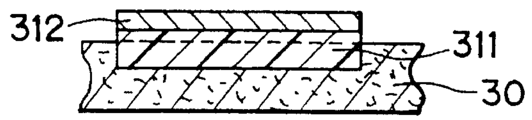
FIG. 20 is a cross-sectional view showing a decorative layer and a hot melting type adhesive layer bonded to a receiving member according to a sixth embodiment of this invention.
Figure 21:
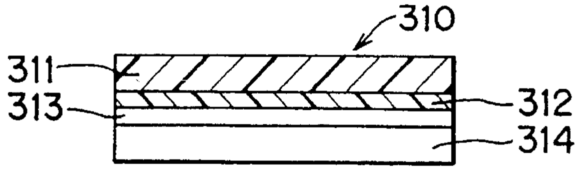
FIG. 21 is a cross-sectional view showing a decorative laminated sheet used in the sixth embodiment of this invention.
Figure 22:
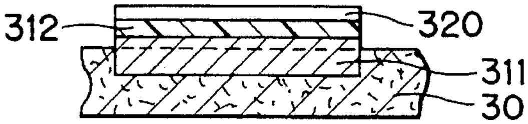
FIG. 22 is a cross-sectional view showing additional decorative layer formed on a decorative layer according to the sixth embodiment of this invention.
Figure 23:
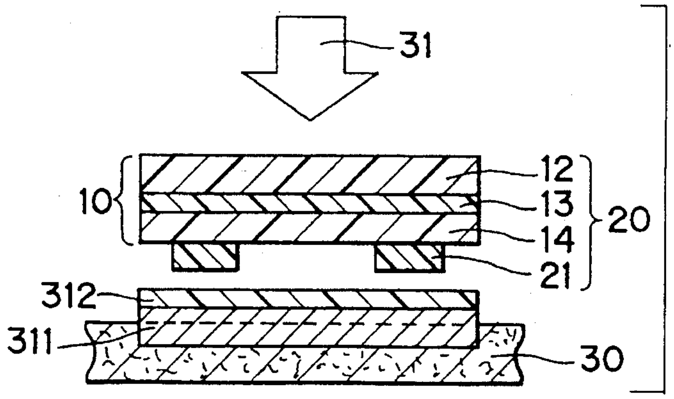
FIG. 23 is a schematic cross-sectional view showing image retransfer process for retransferring the ink image of the print sheet onto the receiving member by the application of heat and pressure according to the sixth embodiment of this invention.

A printing method according to a sixth embodiment of the present invention will next be described with reference to FIGS. 20 through 24. In the sixth embodiment, as shown in FIG. 22, a hot melting type adhesive layer 311 provided with a decorative layer 312 formed of a metal is bonded to a receiving member 30 by heat and pressure. Then, as shown in FIG. 23, the print sheet 10 produced in accordance with the first embodiment of this invention is closely contacted with the decorative layer 312 and heat and pressure is applied to the base substrate 12. Thus, ink image section 21 together with the hot melting type adhesive layer 14 is transferred to the receiving member 30, and at the same time, the printed image is decorated with the decorative layer 312.

Detailed process according to the sixth embodiment will be described. First, a decorative sheet 310 shown in FIG. 21 is prepared. The decorative sheet 310 includes a base 314, a releasable layer 313 formed on the base 314, a decorative layer 312 formed on the releasable layer 313 and a hot melting type adhesive layer 311 formed on the decorative layer 312. The decorative sheet 310 is placed on the receiving member in such a manner that the hot melting type adhesive layer 311 is in facial contact with the receiving member 30 as shown in FIG. 20. Then, the heat and pressure is applied to the base 314, so that the hot melting type adhesive layer 311 is bonded to the member 30. Thereafter, the base 314 is removed from the decorative layer 312, to thereby provide a state shown in FIG. 20.

The base 314 is formed of a film like material such as paper, metallic foil, plastic film etc, and is the same as the material of the base substrate 12 of the foregoing embodiments. The base 314 must be easily separated from the hot melting type adhesive layer 311 regardless of the hot or cool state thereof. Therefore, releasable or separable property between the base 314 and the adhesive layer 311 must be properly adjusted. In this respect, material of the releasable layer 313 should be properly selected. More specifically, for the releasable layer 313, known releasable agent can be used which at least one material selected from silicone resin, fluoro resin, polyolefin resin and paraffin wax, those being similar to the releasable layer 13 of the foregoing embodiments.

Regarding the decorative layer 312 formed on the releasable layer 313, a metallic foil formed of aluminum, chromium, silver, copper and nickel etc can be used. These metallic foil can be formed by ordinarily available vapor deposition method. However, a coloring layer is also available as the decorative layer in which metal powders are dispersed in a resin layer, and further, the decorative layer 312 can be provided by a coloring layer formed of dye or pigment other than metal, or image print or pattern print is available as the decorative layer 312. The hot melting type adhesive layer 311 formed on the decorative layer 312 is made of a material capable of providing sufficient bonding to the receiving member 30 and of facilitating heating and pressing. The material would be the same as the material of the hot melting type adhesive layer 14 in the foregoing embodiments.

Thus, as shown in FIG. 20, the decorative layer 312 is provided on the receiving member 30 through the hot melting type adhesive layer 311 after the removal of the base 314 and the releasable layer 313. Incidentally, FIG. 22 shows a state in which additional decorative layer 320 is provided over the first decorative layer 312. In this case, the first decorative layer 312 is formed of a metal foil, and the additional-decorative layer 320 is formed of one of the coloring layer or image printed layer. The combination of the dual decorative layers 312 and 320 can provide a composite decorative effect.

After the decorative layer is fixed to the receiving member 30, the print sheet 20 is bonded to the decorative layer 312 in a manner similar to the foregoing embodiments as shown in FIG. 23. That is, the image section 21 of the print sheet 20 is brought into intimate contact with the decorative layer 312, and the print sheet 20 is heated and pressed, so that the image section 21 can be fixedly interposed between the hot melting type adhesive layer 14 of the print sheet 20 and the decorative layer 312. The heating and pressing conditions are the same as those of the foregoing embodiments.

In FIG. 23, it is also possible to provide additional hot melting type adhesive layer (not shown) between the image section 21 and the decorative layer 312. The additional layer may be provisionally bonded to the decorative layer 312 by heating and pressing prior to the heating and pressing step 31, or can be merely placed on the decorative layer 312. Further alternatively, the additional adhesive layer can be adhered onto the image section 21 by means of adhesive or viscous agent or by hot melting method.

The materials of the base substrate 12, the hot melting type adhesive layer 14 and the releasable layer 13 are the same as those of the first embodiment. Furthermore, the material of the hot melting type adhesive layer 14 can be in accordance with the third embodiment in which coloring layer 14A can be provided instead of the ordinary hot melting type adhesive layer 14. The material of the coloring layer is-the same as that of the third embodiment. Further, more, the material of the hot melting type adhesive layer 311 is the same as that of the hot melting type adhesive layer 32 or 32A in the second or third embodiment. If the layer 311 is formed of a color layer, the layer 311 can serve to conceal a surface of the receiving member 30, or can provide composite decorative effect in relation to the upper decorative layer 312.

Figure 24:
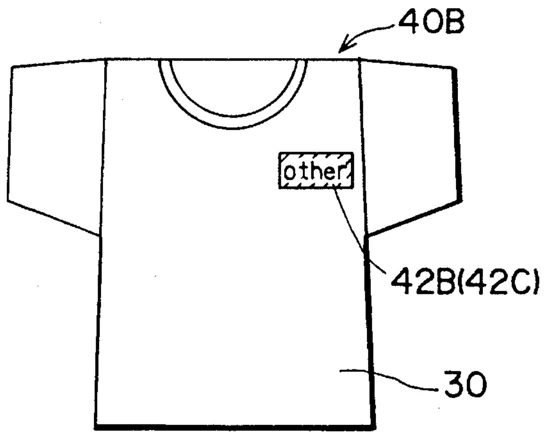
FIG. 24 is a front view showing a print image formed on a receiving member after heating and pressing step according to the sixth or a seventh embodiment of the present invention.

Thus, as shown in FIG. 24, a print image 42B can be provided on the predetermined portion of the receiving member 30. In the print image 42B, the hot melting type adhesive layer 14 and the image section 21 are transferred onto the decorative layer 311 or the additional decorative layer 320, to thereby obtain an intended printed product 40B.

According to the sixth embodiment, the image section 21 is laminatedly interposed between the hot melting type adhesive layer 14 and the decorative layer 312 on the hot melting type adhesive layer 311. Therefore, resultant retransferred image can provide high quality, and the image section 22 is tightly concealed between the two layers, and further, the resultant image can provide high durability against washing. This is due to the fact that the lower hot melting type adhesive layer 311 can absorb surface irregularities of the receiving member 30 for providing a flat image receiving surface. Further, in the sixth embodiment, if the decorative layer 312 is formed of a metallic material, desirable light reflection can occur, to thereby provide clear or luminous image.

Further, in the sixth embodiment, resultant print image 42B having impressive and beautiful appearance can be provided by various arrangement of the decorative layer 312 and/or the hot melting type adhesive layer 311. For example, the metallic foil layer 312 is provided on the layer 311, or additional decorative layer 320 is provided on the layer 312, or the coloring agent is dispersed in the hot melting type adhesive layer 311, or additional coloring layer is provided on the hot melting type adhesive layer 311. More specifically, provided that the decorative layer 312 is formed of the metallic foil, even if the image receiving member 30 has dark color, the distinct print image 42B can be provided regardless of the background color, since the metallic foil layer can reflect light. Provided that the decorative layer 312 is formed of the coloring layer consisting of color dye or color pigment, various kind of color print is achievable. If the decorative layer 312 is formed of fluorescent dye, fluorescent pigment or phosphorescent material, fluorometric or luminous image can be provided in dark place. If the decorative layer 312 is formed of thermochromic material of metallic complex salt type, cholesteric liquid crystal type and leuco dye type, resultant print can vary its color dependent on temperature. If the additional decorative layer 320 printed with various pattern is formed over the decorative layer 312, composite print image can be provided in combination with the lower decorative layer 312.

Thus, according to the sixth embodiment of this invention, the transferred image can be retransferred onto the decorative layer provisionally formed over the receiving member through the hot melting type adhesive layer, and the print sheet provided with the transferred image section is subjected to heating and pressing for retransferring the image on the decorative layer. Therefore, decorated printed image can be easily formed on the image receiving member.

A printing method according to a seventh embodiment of the present invention will be described with reference to FIGS. 24 through 30. The seventh embodiment is analogous to the sixth embodiment. That is, in the seventh embodiment, a hot melting type adhesive layer is formed over the receiving member by heating and pressing. Then, a metallic foil or decorative layer is formed over the hot melting type adhesive layer by heating and pressing. Thereafter, the print sheet 20 is formed over the decorative layer by heating and pressing. Thus, the image section and the hot melting type adhesive layer of the print sheet is transferred onto the decorative layer to provide the print image where the decorative layer adds decoration to the image section.

Figure 25:
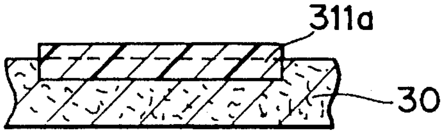
FIG. 25 is a cross-sectional view showing a hot melting type adhesive layer formed on the image receiving member according to the seventh embodiment of this invention.
Figure 26:
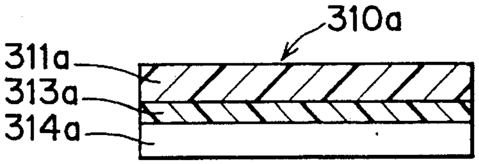
FIG. 26 is a cross-sectional view showing a hot melting type adhesive laminated sheet used in the seventh embodiment of this invention.

First, prepared is a hot melting type adhesive sheet 310*a* shown in FIG. 26 which constitutes a base 314*a*, a releasable layer 313*a* formed on the base, and a hot melting type adhesive layer 311*a* formed on the releasable layer 313*a*. The hot melting type adhesive sheet 310*a* is placed on the receiving member 30 so that the hot melting type adhesive layer 311*a* faces the receiving member 30. Then, heat and pressure are applied to the base 314*a*, so that the hot melting type adhesive layer 311*a* can meltedly bond the receiving member 30. Thereafter, the base 314*a* and the releasable layer 313*a* are removed from the hot melting type adhesive layer 311*a* in order to provide a state shown in FIG. 25. The materials of the base 314*a*, the releasable layer 313*a* and the hot melting type adhesive layer 311*a* are the same as those of the sixth embodiment, and therefore, further description is negligible.

Figure 27:
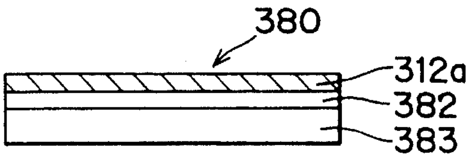
FIG. 27 is a cross-sectional view showing a decorative layer transfer sheet used in the seventh embodiment of this invention.
Figure 28:
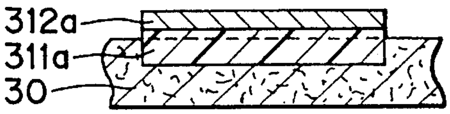
FIG. 28 is a cross-sectional view showing a state in which a metallic foil layer is formed over the hot melting type adhesive layer formed on the receiving member according to the seventh embodiment of this invention.
Figure 29:
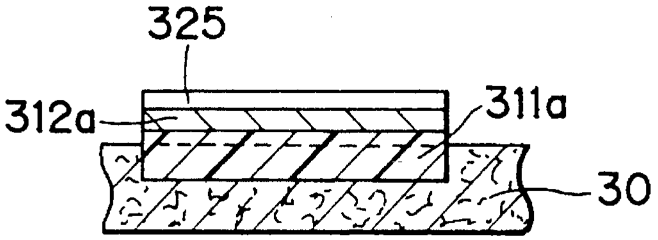
FIG. 29 is a cross-sectional view showing a state in which a decorative layers are formed over the hot melting type adhesive layer formed on the receiving member according to the seventh embodiment of this invention.

Thereafter, a decorative layer transfer sheet 380 shown in FIG. 27 is prepared. The decorative layer transfer sheet 380 is constituted by a base 383, a releasable layer 382 formed over the base 383, and a decorative layer 312*a* formed over the releasable layer 382. The decorative layer transfer sheet 380 is placed on the hot melting type adhesive layer 311*a*, so that the decorative layer 312*a* faces the adhesive layer 311*a*. Then, heat and pressure are applied to the base 383, so that the decorative layer 312*a* can be transferred onto the hot melting type adhesive layer 311*a* as shown in FIG. 28. If necessary, in FIG. 27, additional decorative layer 325 is interposed between the releasable layer 382 and the decorative layer 312*a*, so that the two decorative layers 312*a* and 325 are transferred to the hot melting type adhesive layer 311*a* as shown in FIG. 29.

The decorative layer 312*a* is made of, for example, a metallic foil, and the additional decorative layer 325 is formed of a coloring layer or a pattern printed layer. Similar to the sixth embodiment, the decorative layer 312*a* is made of a metallic foil formed of aluminum, chromium, silver, copper and nickel etc can be used. These metallic foil can be formed by ordinarily available vapor deposition method. However, a coloring layer is also available as the decorative layer 312*a* in which metal powders are dispersed in a resin layer, and further, the decorative layer 312*a* can be provided by a coloring layer formed of dye or pigment other than metal, or image print or pattern print is available as the decorative layer 312*a*. The material of the base 383 and the releasable layer 382 are the same as those of the base 314*a* and the releasable layer 313*a* of the hot melting type adhesive sheet 310*a* shown in FIG. 26.

Figure 30:
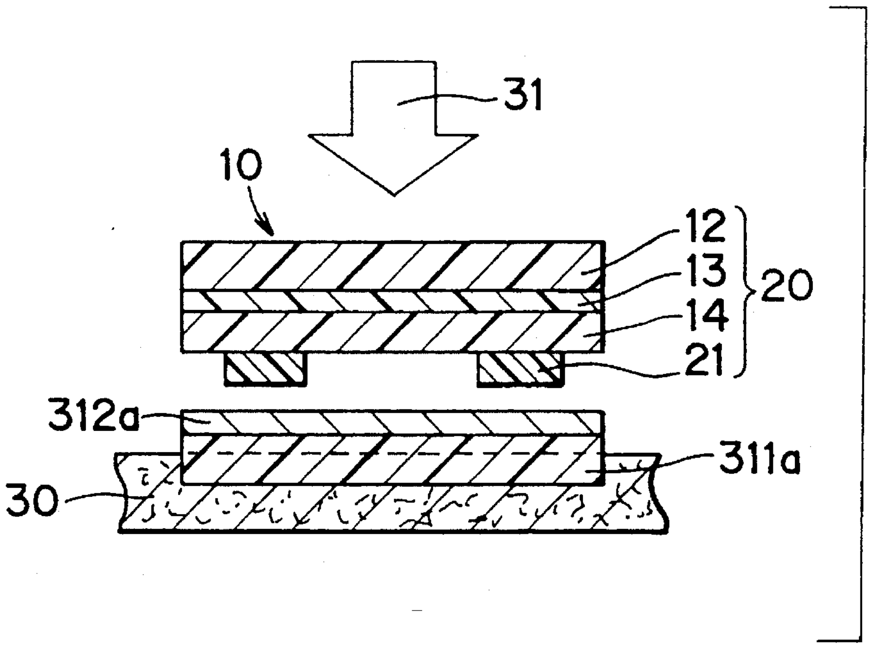
FIG. 30 is a schematic cross-sectional view showing image retransfer process for retransferring the ink image of the print sheet onto the receiving member by the application of heat and pressure according to the seventh embodiment of this invention.

Next, similar to the sixth embodiment, the transfer sheet 20 provided by transferring image on a transfer sheet 10 by means of an image recording device such as a heat sensitive printer, typewriter and word processor is placed on the decorative layer 312*a* as shown in FIG. 30. It goes without saying that the transfer sheet 10, the ink ribbon 17 (FIG. 3), the thermal head 15 and the heater 15 those used in the foregoing embodiments are used for providing the transferred image 21 onto the transfer sheet 10.

After the decorative layer is fixed to the receiving member 30, the print sheet 20 is bonded to the decorative layer 312*a* in a manner similar to the foregoing embodiments as shown in FIG. 30. That is, the image section 21 of the print sheet 20 is brought into intimate contact with the decorative layer 312*a*, and the print sheet 20 is heated and pressed, so that the image section 21 can be fixedly interposed between the hot melting type adhesive layer 14 of the print sheet 20 and the decorative layer 312*a*. The heating and pressing conditions are the same as those of the foregoing embodiments.

In FIG. 30, it is also possible to provide additional hot melting type adhesive layer (not shown) between the image section 21 and the decorative layer 312*a*. The additional layer may be provisionally bonded to the decorative layer 312*a* by heating and pressing prior to the heating and pressing step 31, or can be merely placed on the decorative layer 312*a*. Further alternatively, the additional adhesive layer can be adhered onto the image section 21 by means of adhesive or viscous agent or by hot melting method. The image section 21 of the print sheet 20 is thus brought into intimate contact with the decorative layer 312*a*, and is heatedly pressed. Accordingly, a desirable print image 42C is provided on the receiving member 30 as shown in FIG. 24.

According to the seventh embodiment, the image section 21 is laminatedly interposed between the hot melting type adhesive layer 14 and the decorative layer 312*a* on the hot melting type adhesive layer 311*a*. Therefore, resultant retransferred image can provide high quality, and the image section 21 is tightly concealed between the two layers, and further, the resultant image can provide high durability against washing. This is due to the fact that the lower hot melting type adhesive layer 311*a* can absorb surface irregularities of the receiving member 30 for providing a flat image receiving surface. Further, in the seventh embodiment, if the decorative layer 312*a* is formed of a metallic material, desirable light reflection can occur, to thereby provide clear or luminous image.

Further, in the seventh embodiment, resultant print image 42C having impressive and beautiful appearance can be provided by various arrangement of the decorative layer 312*a* and/or the hot melting type adhesive layer 311*a*. For example, the metallic foil layer 312*a* is provided on the layer 311*a*, or additional decorative layer 325 is provided on the layer 312*a*, or the coloring agent is dispersed in the hot melting type adhesive layer 311*a*, or additional coloring layer is provided on the hot melting type adhesive layer 311*a*. More specifically, provided that the decorative layer 312*a* is formed of the metallic foil, even if the image receiving member 30 has dark color, the distinct print image 42C can be provided regardless of the background color, since the metallic foil layer can reflect light. Provided that the decorative layer 312 is formed of the coloring layer consisting of color dye or color pigment, various kind of color print is achievable. If the decorative layer 312*a* is formed of fluorescent dye, fluorescent pigment or phosphorescent material, fluorometric or luminous image can be provided in dark place. If the decorative layer 312*a* is formed of thermochromic material of metallic complex salt type, cholesteric liquid crystal type and leuco dye type, resultant print can vary its color dependent on temperature. If the additional decorative layer 325 printed with various pattern is formed over the decorative layer 312*a*, composite print image can be provided in combination with the lower decorative layer 312*a*. Thus, according to the seventh embodiment of this invention, the transferred image can be retransferred onto the decorative layer provisionally formed over the receiving member through the hot melting type adhesive layer, and the print sheet provided with the transferred image section is subjected to heating and pressing for retransferring the image on the decorative layer. Therefore, decorated printed image can be easily formed on the image receiving member.

Furthermore, in the seventh embodiment, since the hot melting type adhesive sheet 310*a* and decorative sheet 380 are independently prepared, and attached to the receiving member 30, various decoration control can be easily achieved.

A printing method according to an eighth embodiment of this invention will next be described with reference to FIGS. 31 and 32. The eighth embodiment pertains to an improvement on the sixth and seventh embodiments. In summary, according to the eighth embodiment, the above described print sheet which contains the transfer sheet 10 and the image section 21 as well as the above described decorative sheet and the hot melting type adhesive sheet are integrally produced, and the integral print sheet 430 is placed on the image receiving member for hot pressing. That is, by using a heat transfer type recording device, a desirable transfer image is formed on a hot melting type adhesive layer of the transfer sheet 10. Then, the imaging surface of the hot melting type adhesive layer is superposed with another hot melting type adhesive layer provided with a decorative layer within the recording device or a ribbon cassette, to thereby produce the integral print sheet. The integral print sheet is then placed on a predetermined portion of the image receiving member 30, and heat and pressure is applied to the integral print sheet. Thus, the print image decorated with the decorative layer is provided on the receiving member 30.

Figure 31:
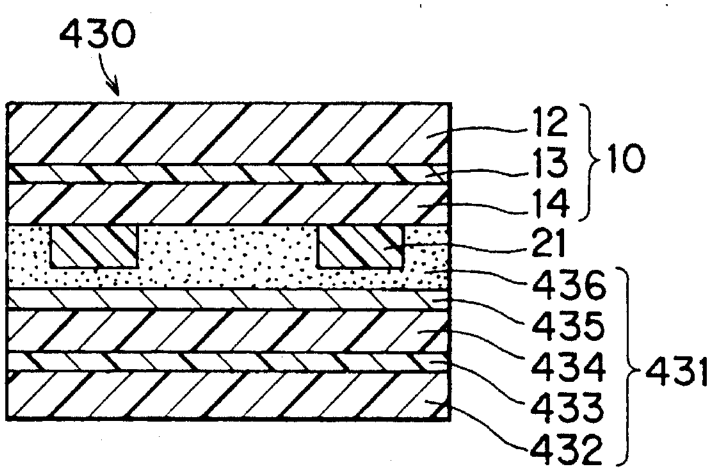
FIG. 31 is a cross-sectional view showing an integral print laminated sheet in which a print sheet and a decorative laminated sheet are bonded with each other according to an eighth embodiment of this invention.

In FIG. 31, similar to the foregoing embodiments, the base substrate 12, the releasable layer 13 and the hot melting type adhesive layer 14 those constituting the transfer sheet 10 are the same as those of the first through third embodiments (FIG. 3). The image transfer is carried out by means of a heat transfer type tape writer described later.

Further, a decorative transfer sheet 431 shown in FIG. 31 includes a base 432, a releasable layer 433, a hot melting type adhesive layer 434, and a decorative layer 435. The material of the base 432 is the same as the material of the base substrate 12. Furthermore, the material of the releasable layer 433 on the base 432 is the same as the material of the releasable layer 13. In any event, the base 432 must be separated from the hot melting type adhesive layer 434 at the heated or cooled state. Thus, separability of the base 432 relative to the hot melting type adhesive layer 434 should be properly adjusted. Further, the material of the base 432 and the releasable layer 433 is preferably selected in view of mechanical strength.

The material of the hot melting type adhesive layer 434 on the releasable layer 433 should be properly selected in view of bonding strength relative to the receiving member 30, heat transferring property, and various resistivity such as washing resistance, light beam resistance, sweat resistance, dry cleaning resistance, free formaldehyde amount, etc, similar to the material of the hot melting type adhesive layer 14.

The material of the decorative layer 435 is the same as that of the foregoing embodiments. That is, the decorative layer 435 is made of a metallic foil formed of aluminum, chromium, silver, copper and nickel etc. These metallic foil can be formed by ordinarily available vapor deposition method. However, a coloring layer is also available as the decorative layer in which metal powders are dispersed in a resin layer, and further, the decorative layer 435 can be provided by a coloring layer formed of dye, pigment, thermochromic material, photochromic material, electrochromic material, fluorescent material, phosphorescent material those other than metal, or image print or pattern print is available as the decorative layer 435. If metallic powder, dye or pigment is used, it is unnecessary to provide the decorative layer 435. Instead, these materials can be dispersed in the hot melting type adhesive layer 434.

Figure 32:
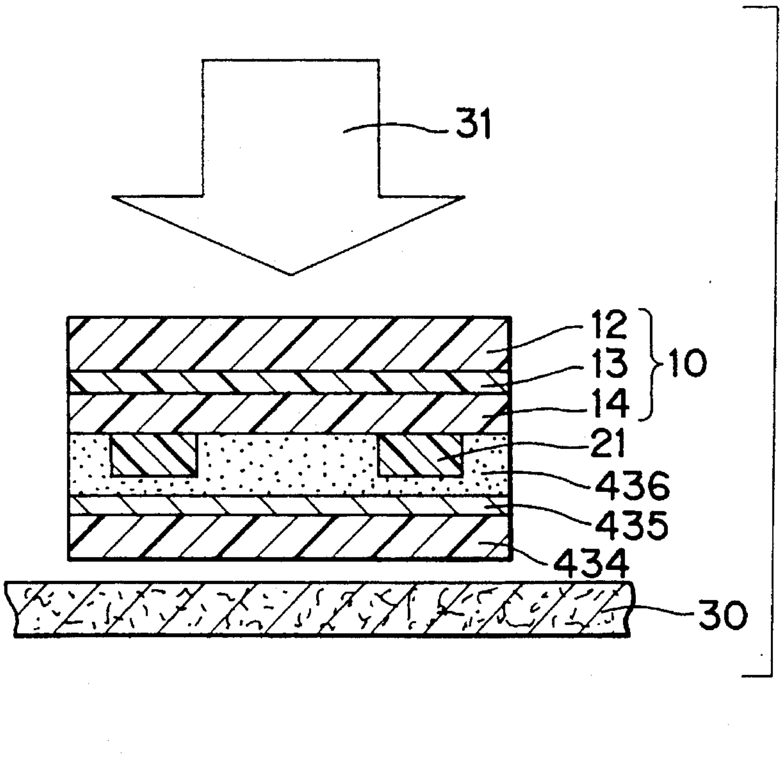
FIG. 32 is a schematic cross-sectional view showing image retransfer process for retransferring the ink image of the print laminated sheet onto the receiving member by the application of heat and pressure according to the eighth embodiment of this invention.

The thus prepared decorative transfer sheet 431 is integrally bonded to the image section 21 of the transfer sheet 10 through a viscous layer 436 as shown in FIG. 31 so as to constitute the integral print sheet 430. the integral print sheet 430 is then heated and pressed onto the image receiving member 30 as shown in FIG. 32 with removing the base 432 and the releasable layer 433.

More specifically, the base 432 is removed from the integral print sheet 430, and the hot melting type adhesive layer 434 is brought into intimate contact with the receiving member 30 such as cloth, paper, wood, metal, plastic material, ceramics, etc. Then, heat and pressure 31 is applied to the top base substrate 12 by means of an iron. The heating and pressing conditions are the same as those of the foregoing embodiments. Accordingly, in the eighth embodiment, the effect the same as that of the sixth and seventh embodiments is obtainable. in any event, in the eighth embodiment, since the integral print sheet contains the print sheet 20 and the decorative transfer sheet 431, only a single heating and pressing work is required for printing image on the image receiving member 30.

Next, a printing method according to a ninth embodiment of this invention will be described with reference to FIGS. 33 through 39. The ninth embodiment pertains to an improvement on the first embodiment, and in which a light reflection layer is incorporated in the resultant printed image.

Figure 33:
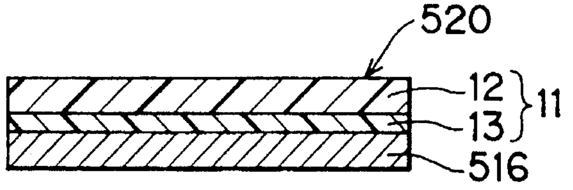
FIGS. 33 through 35 are cross-sectional views showing various examples of transfer sheets each including a reflection layers used in a ninth and tenth embodiments of this invention.
Figure 34:
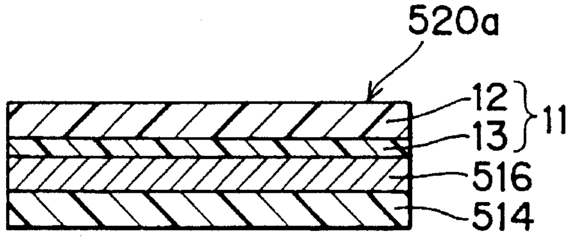
Figure 35:
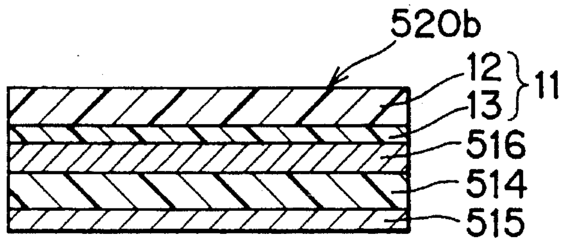

As shown in FIGS. 33 through 35, a light reflection layer 516 is formed on a transfer sheet 520, **520*a*, 520*b*. The transfer sheet 520 shown in FIG. 33 includes a base substrate 12, a releasable layer 13 formed on the base substrate 12 and the light reflection layer 516 formed on the releasable layer 13. The transfer sheet 520*a* shown in FIG. 34 includes the base substrate 12, the releasable layer 13, the light reflection layer 516 and a hot melting type adhesive layer 514 formed on the light reflection layer 516. The transfer sheet 520*b* shown in FIG. 35 further includes a coloring layer 515 formed on the hot melting type adhesive layer 514. The materials of the base substrate 12, the releasable layer 13, the hot melting type adhesive layer 514, and the coloring layer 515 are the same as those of the foregoing embodiments. However, the material of the releasable layer 13 should be properly selected such that the base substrate 12 can be easily separated from the reflection layer 516 even at a heated or cooled state after the image retransfer operation. The hot melting type adhesive layer 514 could be modified similar to the layer 14A in the third embodiment. Further, the coloring layer 515** could be modified in accordance with the foregoing embodiments.

Figure 36:
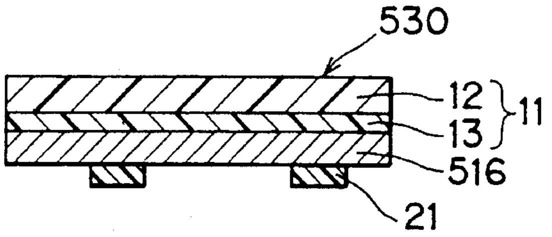
FIG. 36 through 38 are cross-sectional views showing various examples of print sheets in which the transfer sheets of FIGS. 33 through 35 are subjected to ink image transferring.
Figure 37:
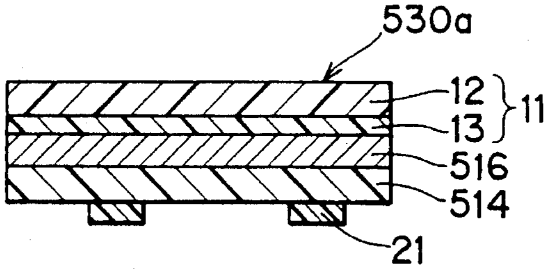
Figure 38:
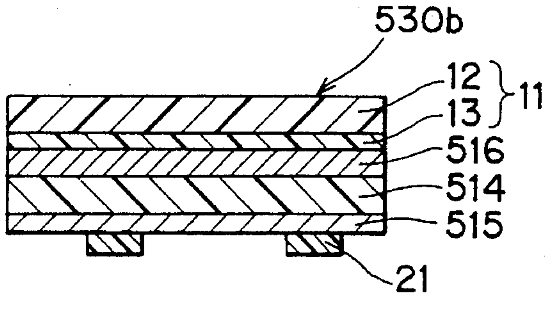

In the ninth embodiment, as shown in FIGS. 36 through 38, an image section 21 is transferred onto the light reflection layer 516 to obtain a print sheet 530 (FIG. 36), onto the hot melting type adhesive layer 514 to obtain a print sheet **530*a* (FIG. 37) and-onto the coloring layer 515 to obtain a print sheet 530*b* (FIG. 38) by using the heat transfer type printer, type writer, word processor, and a tape writer etc. in accordance with the method shown in FIG. 3**.

The light reflection layer 516 is positioned above the image section 21 after the image retransferring process. In other words, the image section 21 is visible through the light reflection layer 516. Therefore, the light reflection layer 516 should be made of a recurrent material so as to allow entering light to reach the internal image section 21. To be more specific, if the light reflection layer 516 provides total reflection, it becomes impossible to observe the internal image section 21. To this effect, for producing the reflection layer 516, glass beads having particle size ranging from 10 to 50 micron meters are bonded to one another by a thermoplastic binder such as ethylene-vinyl acetate copolymer, and wax. The thickness of the light reflection layer 516 is in a range of from 10 to 100 micron meters. The reflection layer 516 serves to provide brilliancy to the internal image section 21.

Figure 39:
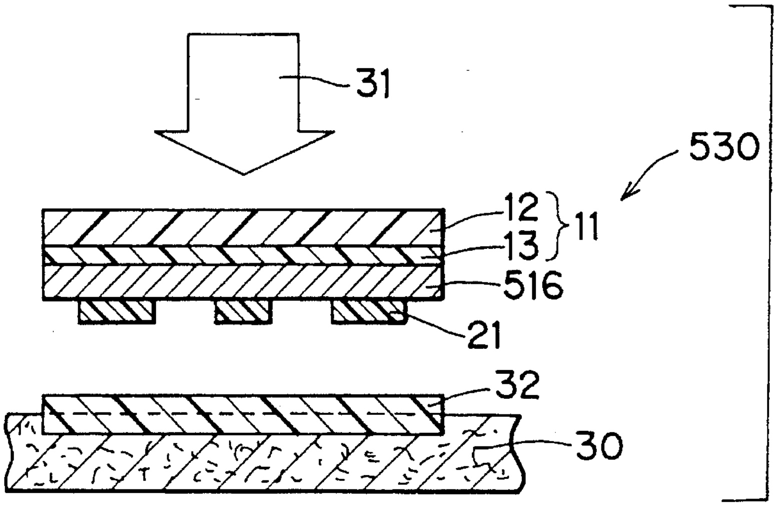
FIG. 39 is a schematic cross-sectional view showing image retransfer process for retransferring the ink image of the print sheet onto the receiving member by the application of heat and pressure according to the ninth embodiment of this invention.

In FIG. 39, the print sheet 530 containing the transfer sheet 520 and the image section 21 is heated and pressed under the condition the same as that of the foregoing embodiment. The same is true with respect to the print sheet **530*a* and 530*b*. In FIG. 39, a hot melting type adhesive layer 32 is provisionally bonded to the image receiving member 30. however, the layer 32** can be dispensed with.

Thus, according to the ninth embodiment, the reflection layer 516 can be provided in the print image by a single heating and pressing process. Therefore, desirable reflective print image can be easily provided without any complexity. Further, since the printed image can reflect light, beautiful and impressive print image can be provided in contrast to the dark color of the image receiving member 30.

Next, a printing method according to a tenth embodiment of this invention will be described with reference to FIGS. 40 and FIGS. 36 through 38. The tenth embodiment is related to the ninth embodiment, and in the tenth embodiment, the hot pressing process shown in FIG. 4 or FIG. 6 is conducted to obtain a state shown in FIG. 7 or FIG. 10 in accordance with the method described in the first or second embodiment. Therefore, resultant retransferred print image is obtained on the image receiving member 30 as shown FIG. 40 in which the image section 21 is embedded in the hot melting type adhesive layer 14 or is interposed between the hot melting type adhesive layers 14 and 32.

Figure 40:
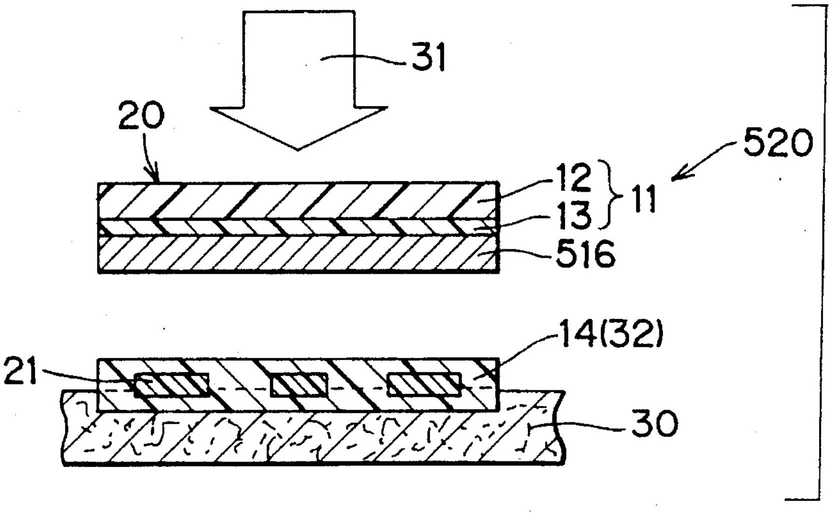
FIG. 40 is a schematic cross-sectional view showing laminating process for laminating a transfer sheet which contains a reflection layer onto image retransferring section on a receiving member by the application of heat and pressure according to the tenth embodiment of this invention.

Then, the transfer sheet 520 (or the transfer sheet **520*a* or 520*b*) provided with the light reflection layer 516 is brought into intimate contact with the print image as shown in FIG. 40, and heat and pressure 31 is applied to the transfer sheet 520. Thereafter, the base sheet 11 is removed from the reflection layer 516. Accordingly, the print image provided with the light reflection layer 516 can be provided on the image receiving member 30. The tenth embodiment provides the effect the same as that of the ninth embodiment, in that the light reflection layer 516 is formed over the image section 21**.

Next, a printing method according to an eleventh embodiment will be described with reference to FIGS. 41 through 45. In the first to tenth embodiments, full area of the transfer sheet is transferred to the image receiving member 30. Therefore, if the actual imaging area is greatly smaller than the area of the transfer sheet, some sense of disorder or imbalance may be felt by the user on the resultant print image. The eleventh embodiment is provided in an attempt to overcome this drawbacks.

Figure 41:
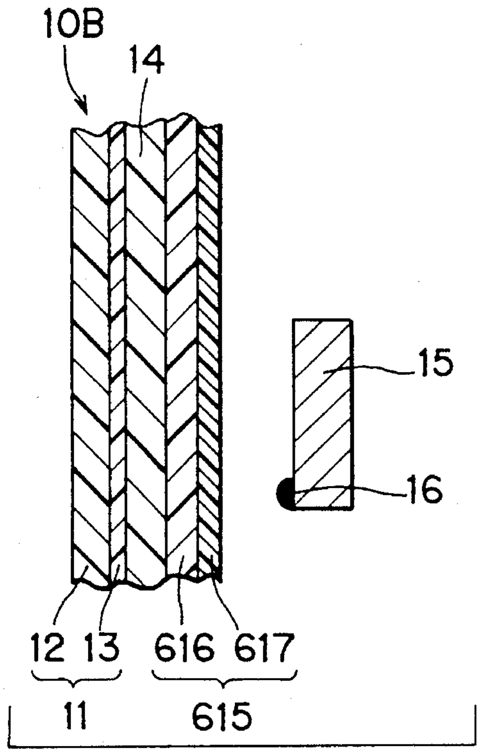
FIG. 41 is a cross-sectional view showing a process for transferring a latent image on a transfer sheet according to an eleventh embodiment of this invention.

In FIG. 41, a transfer sheet 10B includes a base sheet 11 having a base substrate 12 and a releasable layer 13, a hot melting type adhesive layer 14 formed over the releasable layer 13, and a mesh sheet 615 formed on the hot melting type adhesive layer 14. The mesh sheet 615 includes a mesh base 616 and a thermoplastic resin layer 617. By using the thermal head 15 and a heater 16, a desirable "latent" image 21A (FIG. 42) is formed on the transfer sheet 10B. The latent image 21A is in the form of a real image or a mirror image, and is provided by a hole defined by a partial removal of the thermoplastic resin layer 617 as shown in FIG. 42.

More specifically, intended characters or picture image are inputted into the image recording device such as a heat transfer type printer, type writer, word processor and a tape writer through manipulation to a key board or mouse. In response to the input signal, the heater 16 on the thermal head 15 is heated, and a portion of the thermoplastic layer 617 confronting the heated portion of the heater are melted, so that the hole are formed. The hole defines the transferable latent image on the transfer sheet 10B. In order to effectively provide the transferable latent image 21A on the transfer sheet 10B, position or configuration of the heating member 16, contact pressure of the thermal head 15, attachment angle of the thermal head 15, energy supplied to the thermal head 15, and printing speed etc. must be properly adjusted.

Figure 42:
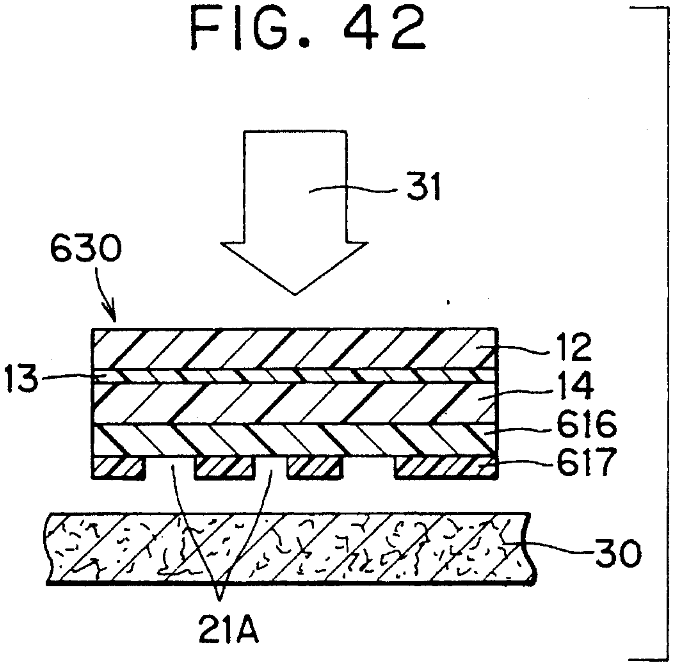
FIG. 42 is a cross-sectional view showing an image forming process for only forming image on the receiving member according to the eleventh embodiment of this invention.

In FIG. 42, by applying heat and pressure 31 to the base substrate 12 of the print sheet 630, the hot melting type adhesive layer 14 is meltedly passed through the image-wise holes 21A formed in the mesh sheet 615, so that the melted hot melting type adhesive layer 14 can provide the final intended image on the receiving member 30.

The material of the base substrate 12 and the releasable layer 13 are the same as those of the first embodiment on the premise of separability of the base substrate from the hot melting type adhesive layer 14 after the image retransferring process. Further, the hot melting type adhesive layer 14 on the releasable layer 13 must pass through the hole 21A which defines the latent image under heat and pressure, and must be transferred onto the receiving member 30. Thus the material of the hot melting type adhesive layer 14 must provide proper softening point or melting point and melting viscosity suitable for the heating and pressing conditions given by the iron. Furthermore, similar to the foregoing embodiments, the material of the adhesive layer 14 must be selected in view of quality of the final print image, touch and feeling, sense of incompatibility, brilliance, durability against washing, light beam, sweat, dry cleaning and amount of free formaldehyde. In this connection, the material of the adhesive layer 14 is the same as that of the first embodiment.

Figure 43:
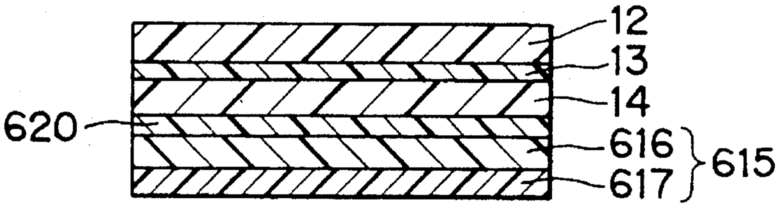
FIG. 43 is a cross-sectional view showing a transfer sheet used in the eleventh embodiment of this invention.

Moreover, the hot melting type adhesive layer can provide color, luminous light, or can vary its color dependent on temperature. Therefore, the material of the adhesive layer 14A described in the third embodiment of this invention is available. In this case, as shown in FIG. 43, a coloring layer 620 can be provided between the hot melting type adhesive layer 14 and the mesh sheet 615, the layer 14 also containing the coloring agent, if necessary. Further, the coloring layer 620 can be positioned between the hot melting type adhesive layer 14 and the releasable layer 13.

The mesh sheet 615 at which the desirable latent image 21A is formed is formed on the hot melting type adhesive layer 14 on the transfer sheet 10B. The mesh base 616 of the mesh sheet 615 is formed of porous and heat resistant material. For example, heat resistant and porous paper, metal, plastic material, inorganic material, etc. are available as the mesh base 616. On the mesh base 616, the thermoplastic resin layer 617 is laminated. The layer 617 is melted and forms holes upon heating from the thermal head. However, the material of the thermoplastic resin layer 617 is not melted at a temperature applied when the print sheet 630 is to be heated and pressed onto the receiving member. For example, a thermoplastic resin such as polyester and polyvinylidene chloride having softening or melting point of riot less than 150° C. may be available. However, this temperature is not fixed but can be varied dependent on the heating amount in the image recording device for forming the latent image and temperature and heating period for image retransfer onto the receiving member.

The thus processed print sheet 630 is taken out of the image recording device and is positioned onto the predetermined portion of the receiving member 30. The print sheet 630 has a real latent image or mirror latent image on the transfer sheet 10B. Then, the print sheet 630 is heated and pressed under the condition similar to the first embodiment.

Figure 44:
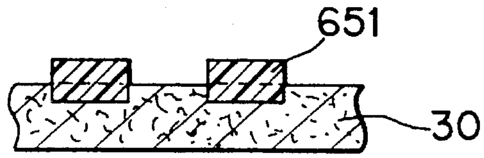
FIG. 44 is a cross-sectional view showing an exact image portion formed on the image receiving member according to the eleventh embodiment of this invention.

Accordingly, portions of the hot melting type adhesive layer 14, which portions correspond to the latent image or hole portion 21A are transferred onto the receiving member 30 as shown in FIG. 44, whereby only the imaging section 651 can be provided on the receiving member 30. Alternatively, if the transfer sheet shown in FIG. 43 is used, portions of the hot melting type adhesive layer 14 and the portions of the coloring layer 620, which portions correspond to the latent image or hole portion 21A are transferred onto the receiving member As a result, only the imaging section 660 can be provided on the receiving member 30. In the imaging section 660,the hot melting type adhesive layer 14 and the coloring layer 620 constitute the actual print image 651. The hot melting type adhesive layer 14 which constitutes the print image 651 is firmly bonded to the surface or textile of the receiving member 30.

Figure 45:
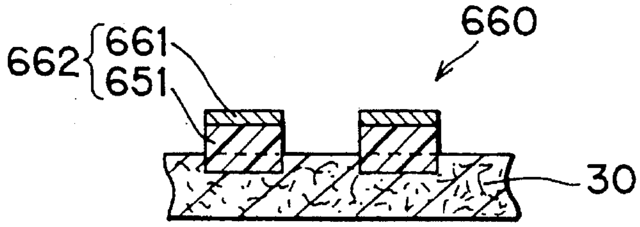
FIG. 45 is a cross-sectional view showing an exact image portion formed on the image receiving member according to one modification to the eleventh embodiment in which a brushy layer or metallic foil layer is formed over the exact image portion.

FIG. 45 shows one modification to the eleventh embodiment. In the modification, a brushy sheet or decorative sheet or recurrent type sheet is closely contacted with the upper surface of the transferred image section 651, and then, the sheet is peeled off from the upper surface. Thus, brushy print image or decorative print image or light recurrent print image 661 can be provided on the image section 651. In this case, since the hot melting type adhesive layer 14 is not directly exposed to the atmosphere, any sticky sense which is inherent to the hot melting type adhesive material 14 can be eliminated, and improved image segments can be provided on the receiving sheet.

Thus, in the eleventh embodiment, only all actual image area can be formed on the receiving member 30 without any transfer of the surplus portion thereon, and further, only a single heating and pressing process is required for transferring image onto the receiving member 30.

Next, one arrangement of a tape writer 790 for thermally transferring the image 21 onto the transfer sheet 10 will be described with reference to FIGS. 46 and 47 and in conjunction with the eighth embodiment referring FIG. 31.

Figure 46:
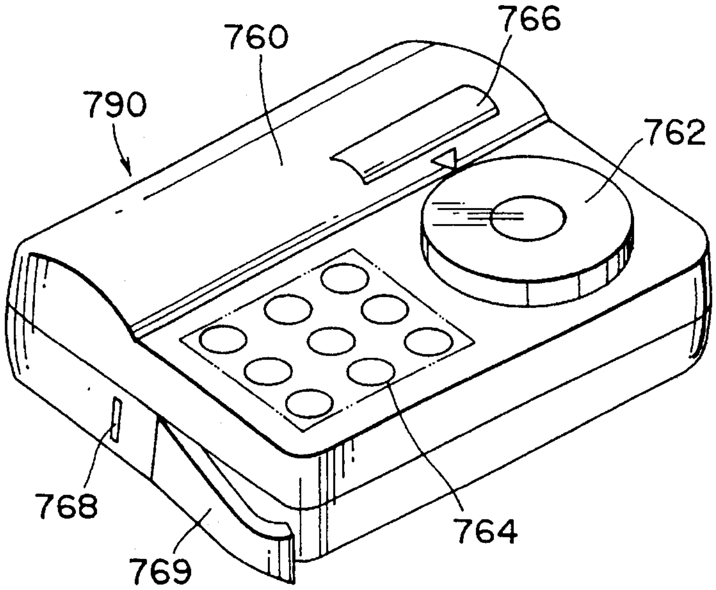
FIG. 46 is a perspective view showing a device for making a print sheet according to the present invention.

In FIG. 46, the tape writer 790 has a casing 760 whose upper surface is provided with an operation dial 762 and a key board 764 for inputting intended characters or marks and for inputting command signal for the image transfer. The upper portion of the casing 760 is also provided with a liquid crystal display 766 for displaying the inputted characters or marks. The casing 760 has a side wall at which a discharge port 768 is formed through which the print sheet 430 (FIG. 31) is discharged. At the side wall, a cutter lever 769 is also provided for cutting the print sheet 430.

Figure 47:
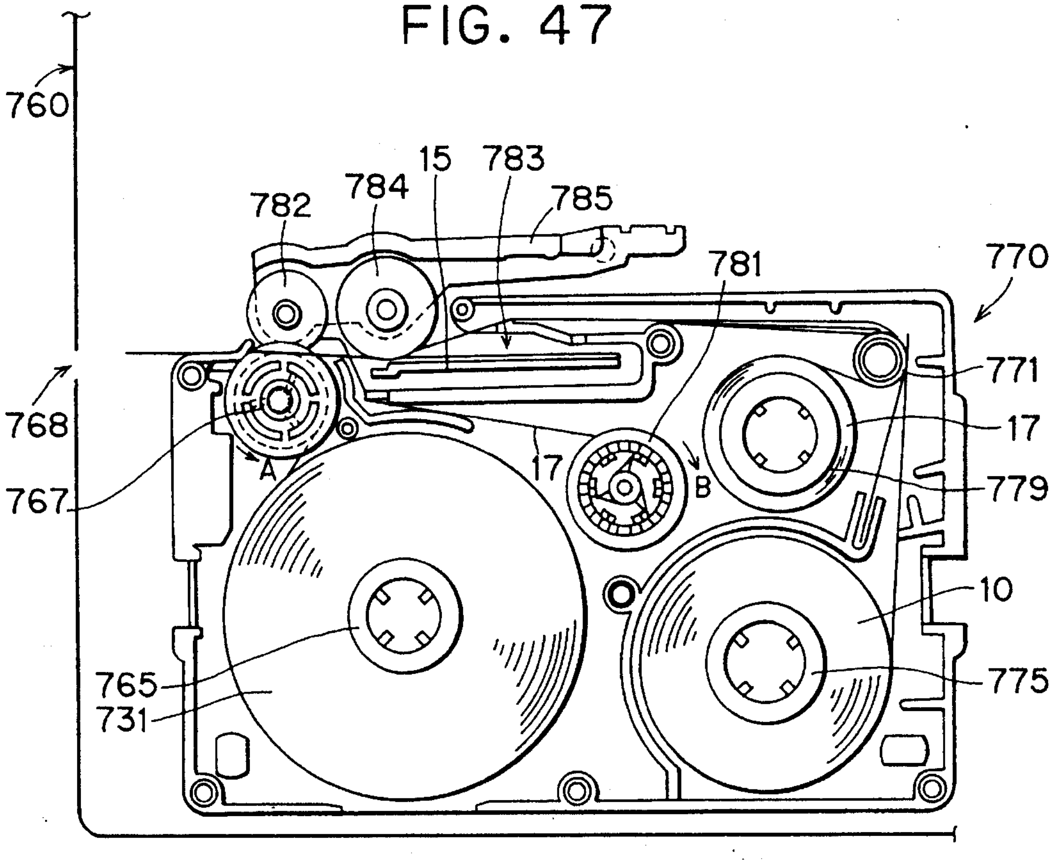
FIG. 47 is a plan view showing an internal arrangement of the device having a cartridge and a ink image recording device according to the present invention.

FIG. 47 shows the thermal head 15 and an internal arrangement of a cartridge 770 accommodated within the casing 760 of the tape writer 790. In the cartridge 770, there are provided a transfer sheet spool 775 for winding the transfer sheet 10, an ink ribbon spool 779 for winding the ink ribbon 17 whose inking surface of positioned radially inwardly, a takeup spool 781 for taking up the ink ribbon 17 and a decorative transfer sheet spool 765 over which the decorative transfer sheet 431 is wound with the base 432 being positioned radially outwardly. The details of the transfer sheet 10, the decorative transfer sheet 431 and the ink ribbon 17 have been described above in connection with the eighth embodiment.

In the cartridge 770, a guide pin 771 is provided for guiding the transfer sheet 10 and the ink ribbon 17. Further, in the cartridge 770, an alignment roller 767 is provided for aligning the transfer sheet 10 with the decorative transfer sheet 431. These spools 775, 779, 781, 765, the guide pin 771 and the alignment roller 767 are rotatably supported on the cartridge 770 and are covered with a lid member (not shown), to thereby being accommodated within the casing 760.

The transfer sheet 10 and the ink ribbon 17 are guided to a recessed portion 783 by the guide pin 771 in such a manner that the inking surface of the ink ribbon 17 faces the transfer sheet 10, and the ink ribbon 17 is directed toward the takeup spool 781 through a platen roller 784 (described later) and a thermal head 15. Further, the transfer sheet 10 is guided by the alignment roller 767. Moreover the decorative transfer sheet 431 is guided by the alignment roller 767 with the decorative layer 435 (opposite the base 432) facing the transfer sheet 10. Incidentally, the takeup spool 781 and the alignment roller 767 are drivingly rotated in directions indicated by arrows B and A, respectively, by means of a drive motor (not shown) through a power transmission mechanism (not shown).

In the recessed portion 783 of the cartridge 770, the thermal head 15 provided with the above described heater 16 (FIG. 3) is provided. As described above, the thermal head 15 is adapted to transfer intended ink image onto the transfer sheet 10 through the ink ribbon 17. In the vicinity of the thermal head 15, a support member 785 is provided, and on the support plate 785, the platen roller 784 is provided movable toward and away from the thermal head 15. Further, a feed roller 782 is also supported on the support member 785. The feed roller 782 is movable toward and away from the alignment roller 782. As described above, in order to properly transfer the inked image onto the transfer sheet 10, position or configuration of the heater 16 on the thermal head 15, winding torque of the ink ribbon 17, contact pressure of the thermal head 15, attachment angle of the head 15 and an electric power to be supplied to the thermal head 15, and transfer speed must be properly controlled.

In operation, by the manipulation to the key board 764 and the operation dial 762, intended characters or marks are inputted, and if the thermal transfer command signal is inputted, heaters 16 of the thermal head 15 are heated in conformance with the inputted characters or marks, the heating portions being corresponding to the mirror image or real image patterns of the inputted characters or marks. On the platen roller 784, inked image is transferred onto the hot melting type adhesive layer 14 of the transfer sheet 10 through the ink ribbon 17. At the same time, upon energization of the drive motor (not shown), the alignment roller 767 is rotated in the direction indicated by the arrow A, and the takeup spool 781 is rotated in the direction indicated by the arrow B. By the rotation of the takeup spool 781, the used portion of the ink ribbon 17 is wound over the takeup spool 781. Further, by the rotation of the alignment roller 767, the imaging surface of the print sheet 20 (the transfer sheet 10 printed with the transferred image section 21) and the decorative surface 435 of the decorative transfer sheet 431 are bonded to each other through the viscous layer 436 at a position between the alignment roller 767 and the feed roller 782, to thereby provide the integral print sheet 430. The integral print sheet 430 is fed out of the cartridge 770 and is discharged from the casing 760 through the discharge port 768. The thus discharged integral print sheet 430 is cut by the cutter lever 769.

Therefore, as shown in FIG. 31, the resultant integral print sheet 430 has the transferred image section 21, the base 432 at one side, and the base substrate 12 at the opposite side. In the illustrated embodiment, the transferred sheet 10 on which the image section 21 is formed is bonded to the decorative transfer sheet 431 through the viscous material 436. However, it is unnecessary to provide the viscous layer 436. That is, the transfer sheet 10 can be merely pressedly bonded to the decorative transfer sheet 431 so far as these two sheet 10 and 431 are superposed with each other until the heating and pressing process is executed for the final image retransfer process onto the receiving member 30.

Further, the tape writer 790 described above is provided with the accommodation of the decorative transfer sheet 431 within the cartridge 770, so as to bond the transfer sheet 10 to the decorative transfer sheet 431 within the cartridge 770. However, various modification can be made. For example, the decorative transfer sheet 431 is not positioned within the cartridge 770, but is positioned outside the cartridge 770, and bonding to the transfer sheet 10 is carried out at a position outside the cartridge 770. Accordingly, the print sheets according to the various embodiments of this invention can be produced by the tape writer 790 or by the modification of the tape writer. Further, the cartridge 770 can be dispensed with. That is, the transfer sheet 10, the ink ribbon 17 or the decorative transfer sheet 431 can be positioned in the casing 760 without any employment of the cartridge 770.

The tape writer is can be referred to as a print sheet making device. Further several modifications may be effected to the tape writer described. For example, instead of the decorative transfer sheet spool 765, the spool can wound thereover a lamination sheet having the other hot melting type adhesive layer 32, so that the image section can be sandwiched by the two adhesive layers 14 and 32 within the tape writer in order to perform the second embodiment of this invention. Further, the tape writer can be usable for other Embodiments with modifications conceivable for those skilled in the art within the meaning of scope and spirit of this invention.

Next, various Examples of the present invention will be described to further clarify the merits of the invention.

Example 1

The following Examples 1 through 3 are in accordance with the first embodiment of this invention.

The ink image formed on the transfer sheet was retransferred to a T-shirt made of 100% cotton by a hot-stamping under the condition of temperature of 150° C., pressure 200g/cm$^2$, and stamping period of 10 seconds. Thus formed print image on the T-shirt had a high quality without blot, blur, collapse, and the like. Further, the print image showed a good appearance with brightness, and provided a good touch feeling without incompatible sense.

The print image on the T-shirt was tested on fastness against washing, abrasion, sweat, dry-cleaning, and light beam, and amount of free formaldehyde by Japan Synthetic Textile Inspection Institute Foundation (JSTIIF). The testing-modes are defined by Japanese Industrial Standard (JIS) as follows:

Washing Fastness: JIS L0844-1973, A-2

Light Beam Fastness: JIS L0842-1971

Sweat Fastness: JIS L0848-1978

Abrasion Fastness: JIS L0849-1971

Dry Cleaning Fastness: JIS L0860-1974

The judgment (grade) was in accordance with JIS L0801.10.

The test provided extremely desirable result as follows:

Washing Fastness Color fade: 5th grade
Contamination: 5th grade

Light Beam Fastness not less than 4th grade

Sweat Fastness Acid Color fade: 5th grade
Contamination: 5th grade
Alkali Color fade: 5th grade
Contamination: 5th grade Abrasion Fastness Dry state: 5th grade
Wet state: 5th grade Dry Cleaning Fastness Color fade: 5th grade
Contamination: 5th grade Amount of Free formaldehyde not more than 0.05

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 2

An ink image was thermosensitively transferred on a transfer sheet which includes a glassine paper provided with a polyurethane resin layer of thickness 50 micron meters through a releasable layer of paraffin wax by a heat-sensitive image transfer type tape writer (P-touch manufactured by Brother Kogyo K.K.) at ambient temperature of 10° C. to 35° C. Thus formed ink image was extremely clear and fine.

The ink image formed on the transfer sheet was retransferred to a handkerchief made of 100% cotton by a hot-stamping under the condition of temperature 140° C., pressure 150g/cm$^2$, and stamping period 15 sec. Thus formed print image on the handkerchief had a high quality without blot, blur, collapse, and the like. Further, the print image showed a good appearance with brightness, and provided a good touch feeling without incompatible sense.

The print image on the handkerchief was tested on fastness against washing, abrasion, sweat, dry-cleaning, and light beam, and amount of free formaldehyde by Japan Synthetic Textile Inspection Institute Foundation (JSTIIF). The test provided extremely desirable result. This test results were as follows:

Washing Fastness Color fade: 5th grade
Contamination: 5th grade

Light Beam Fastness not less than 4th grade

Sweat Fastness Acid Color fade: 5th grade
Contamination: 5th grade
Alkali Color fade: 5th grade
Contamination: 5th grade Abrasion Fastness Dry state: 5th grade
Wet state: 5th grade Dry Cleaning Fastness Color fade: 5th grade
Contamination: 5th grade Amount of Free formaldehyde not more than 0.05

The transfer sheet was subjected to a preservation test under the conditions at temperature of 55° C. for 24 hours; temperature of 35° C. humidity of 80% for 48 hours; and temperature of −20° C. for 24 hours. No abnormality were found after the tests.

Example 3

An ink image was thermosensitively transferred on a transfer sheet which includes a polyester film provided with a etylene-vinyl acetate copolymer layer of thickness 30 micron meters through a releasable layer of silicone by a heat-sensitive image transfer tape writer (P-touch manufactured by Brother Kogyo K.K.) at ambient temperature of 10° C. to 35° C. Thus formed ink image was extremely clear and fine.

The ink image formed on the transfer sheet was retransferred to a T-shirt made of 100% cotton by a hot-stamping under the condition of temperature of 130° C., pressure 200g/cm$^2$, and stamping period of 10 sec. Thus formed print image on the T-shirt was possessed of a high quality without blot, blur, collapse, and the like. Further, the print image showed a good appearance with brightness, and provided a good touch feeling without incompatible sense.

The print image on the T-shirt was tested on fastness against washing, abrasion, sweat,dry-cleaning, and light beam, and amount of free formaldehyde by Japan Synthetic Textile Inspection Institute Foundation (JSTIIF). The test provided extremely desirable result except for the durability against dry-cleaning. This test results were as follows:

Washing Fastness Color fade: 5th grade
Contamination: 5th grade

Light Beam Fastness not less than 4th grade

Sweat Fastness Acid Color fade: 5th grade
Contamination: 5th grade
Alkali Color fade: 5th grade
Contamination: 5th grade Abrasion Fastness Dry state: 4th to 5th grade
Wet state: 5th grade Dry Cleaning Fastness Color fade: 2nd grade
Contamination: 5th grade Amount of Free formaldehyde not more than 0.05

The transfer sheet was subjected to a preservation test under the conditions at temperature of 55° C. for 24 hours; temperature of 35° C., humidity of 80% for 48 hours; and temperature of −20° C. for 24 hours. The test samples had states the same as their initial state.

Example 4

The following Examples 4 through 6 are in accordance with the second embodiment of the present invention. An ink image was thermosensitively transferred on a transfer sheet which includes a craft paper (base substrate) provided with a ethylene-vinyl acetate resin-polyurethane layer(hot melting type adhesive layer) having thickness of 20 micron meters through a releasable layer of silicone by a heat-sensitive image transfer type tape writer (P-touch manufactured by Brother Kogyo K.K.) at ambient temperature of 10° C. to 35° C. Thus formed ink image was extremely clear and fine.

Next, in order to provide the other hot melting type adhesive layer (32 in FIG. 6) over the receiving member, another transfer sheet the same as the above was closely contacted with a T-shirt made of 100% cotton with the ethylene-vinyl acetate resin-polyurethane layer facing the T-shirt. Then, hot stamping was carried out against the craft paper at the temperature of 180° C. and at a pressure of 200 g/cm$^2$. for 10 seconds, and thereafter, the craft paper was removed from the layer. Thus, the other hot melting type adhesive layer of olefin group was provided on the T-shirt.

Further, the ink image formed on the transfer sheet was retransferred to the thus transferred ethylene-vinyl acetate resin-polyurethane layer by a hot-stamping under the condition of temperature of 180° C., pressure 200g/cm$^2$, and stamping period of 10 seconds. Thus formed print image on the T-shirt had a high quality without blot, blur, collapse, and the like. Further, the print image showed a good appearance with brightness, and provided a good touch feeling without incompatible sense.

The print image on the T-shirt was tested on fastness against washing, abrasion, sweat, dry-cleaning, and light beam, and amount of free formaldehyde by Japan Synthetic Textile Inspection Institute Foundation (JSTIIF).

The test provided extremely desirable result as follows:

Washing Fastness Color fade: 5th grade
Contamination: 5th grade

Light Beam Fastness not less than 4th grade

Sweat Fastness Acid Color fade: 5th grade
Contamination: 5th grade
Alkali Color fade: 5th grade
Contamination: 5th grade Abrasion Fastness Dry state: 5th grade
Wet state: 5th grade Dry Cleaning Fastness Color fade: 2nd grade
Contamination: 5th grade Amount of Free formaldehyde: not more than 0.05

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 5

An ink image was thermosensitively transferred on a transfer sheet which includes a craft paper (base substrate) provided with a polyamide layer(hot melting type adhesive layer) having thickness of 30 micron meters through a releasable layer of silicone by a heat-sensitive image transfer type tape writer (P-touch manufactured by Brother Kogyo K.K.) at ambient temperature of 10° C. to 35° C. Thus formed ink image was extremely clear and fine.

Next, prepared was another laminated sheet including a polyolefin layer (serving as the other hot melting type adhesive layer 32) having a thickness of 50 micron meters, a releasable layer and a base layer. Then the polyolefin layer was closely contacted with the ink imaging surface of the transfer sheet, and hot stamping was carried out under the condition of temperature of 150° C., pressure of 150 g/cm$^2$ for 15 seconds. Thus, the other hot melting type adhesive layer was provisionally bonded to the image section, to thereby provide a print sheet.

Further, the print sheet was placed on a handkerchief of 100% cotton, and hot stamping was carried out under the condition of temperature of 150° C., pressure 150 g/cm$^2$, and stamping period of 15 seconds. Thus formed print image on the handkerchief had a high quality without blot, blur, collapse, and the like. Further, the print image showed a good appearance with brightness, and provided a good touch feeling without incompatible sense.

The print image on the handkerchief was tested on fastness against washing, abrasion, sweat, dry-cleaning, and light beam, and amount of free formaldehyde by Japan Synthetic Textile Inspection Institute Foundation (JSTIIF). The testing modes are defined by Japanese Industrial Standard (JIS) as follows:

The test provided extremely desirable result as follows:

Washing Fastness Color fade: 5th grade
Contamination: 5th grade

Light Beam Fastness not less than 4th grade

Sweat Fastness Acid Color fade: 5th grade
Contamination: 5th grade
Alkali Color fade: 5th grade
Contamination: 5th grade Abrasion Fastness Dry state: 5th grade
Wet state: 5th grade Dry Cleaning Fastness Color fade: 5th grade
Contamination: 5th grade Amount of Free formaldehyde: not more than 0.05

The transfer sheet was subjected to a preservation test under the conditions at temperature of 55° C. for 24 hours; temperature of 35° C. humidity of 80% for 48 hours; and temperature of −20° C. for 24 hours. The test samples exhibited final states the same as their initial states.

Example 6

An ink image was thermosensitively transferred on a transfer sheet which includes a craft paper (base substrate) provided with a ethylene-vinyl acetate copolymer layer (hot melting type adhesive layer) having thickness of 30 micron meters through a releasable layer of silicone by a heat-sensitive image transfer type tape writer (P-touch manufactured by Brother Kogyo K.K.) at ambient temperature of 10° C. to 35° C. Thus formed ink image was extremely clear and fine. The image surface of the thus prepared print sheet was laminated with a ethylene-vinyl acetate copolymer layer (other hot melting type adhesive layer 32) of another lamination sheet(which consists of the layer 32, the releasable layer 52 and the base 53 those shown in FIG. 8) within a ribbon cassette of the take writer. Therefore, the transferable print laminate sheet 50 shown in FIG. 8 was obtained. As described above, the print sheet 20 is bonded to the other laminate sheet by means of the viscous layer 51.

Next, the transferable print laminate sheet 50 was placed on a T-shirt of 100% cotton, and hot stamping was carried out under the condition of temperature of 130° C., pressure 200 g/cm$^2$, and stamping period of 10 seconds. Thus formed print image on the T-shirt had a high quality without blot, blur, collapse, and the like. Further, the print image showed a good appearance with brightness, and provided a good touch feeling without incompatible sense.

The print image on the T-shirt was tested on fastness against washing, abrasion, sweat, dry-cleaning, and light beam, and amount of free formaldehyde by Japan Synthetic Textile Inspection Institute Foundation (JSTIIF).

The test provided extremely desirable result as follows:

Washing Fastness Color fade: 5th grade
Contamination: 5th grade

Light Beam Fastness not less than 4th grade

Sweat Fastness Acid Color fade: 5th grade
Contamination: 5th grade
Alkali Color fade: 5th grade
Contamination: 5th grade Abrasion Fastness Dry state: 5th grade
Wet state: 5th grade Dry Cleaning Fastness Color fade: 2nd grade
Contamination: 5th grade Amount of Free formaldehyde: not more than 0.05

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 7

Examples 7 through 9 pertains to the third embodiment of this invention. In Example 7, the transfer sheet the same as that used in Example 4 was used, and ink image was transferred to the transfer sheet under the condition the same as that of Example 4.

Next, a lamination sheet was prepared. The lamination sheet included ethylene vinyl acetate resin-polyurethane layer, a coloring layer, releasable layer and a base. The coloring layer was positioned between the ethylene vinyl acetate resin-polyurethane layer and the releasable layer. The details of the coloring layer was as follows:

ethylene-vinyl acetate copolymer: 4 parts by weight, (DuPont-Mitsui Polychemicals Co.,Ltd. "EVAFLEX 210")

Density of the ethylene-vinyl acetate copolymer: 28%

Melt Index: 400 titanium oxide: 1 part by weight (Ishihara Sangyo K.K. "TIPAQUE R-680") rutile type titanium oxide The lamination sheet was placed on a T-shirt of 100% cotton with the EVAFLEX 210 layer facing the T-shirt, and hot stamping was effected through the base and the releasable layer under the condition of temperature of 180° C. and at a pressure of 200 g/cm$^2$. for 10 seconds, and thereafter, the base and the releasable layer were removed from the EVAFLEX layer. Thus, the other hot melting type adhesive layer of olefin group was provided on the T-shirt.

Further, the ink image formed on the transfer sheet was retransferred to the thus transferred coloring layer on the ethylene-vinyl acetate resin-polyurethane layer by a hot-stamping under the condition of temperature of 180° C., pressure 200g/cm$^2$, and stamping period of 10 seconds. Thus formed print image on the T-shirt had a high quality without blot, blur, collapse, and the like. Further, the print image showed a good appearance with brightness, and provided a good touch feeling without incompatible sense.

The print image on the T-shirt was tested on fastness against washing, abrasion, sweat, dry-cleaning, and light beam, and amount of free formaldehyde by Japan Synthetic Textile Inspection Institute Foundation (JSTIIF).

The test provided extremely desirable result as follows:

Washing Fastness Color fade: 5th grade
  Contamination: 5th grade

Light Beam Fastness not less than 4th grade

Sweat Fastness Acid Color fade: 5th grade
  Contamination: 5th grade
  Alkali Color fade: 5th grade
  Contamination: 5th grade Abrasion Fastness Dry state: 5th grade
  Wet state: 5th grade Dry Cleaning Fastness Color fade: 2nd grade
  Contamination: 5th grade Amount of Free formaldehyde: not more than 0.05

The transfer sheet was subjected to a preservation test under the conditions at temperature of 55° C. for 24 hours; temperature of 35° C., humidity of 80% for 48 hours; and temperature of –20° C. for 24 hours. The test samples exhibited final states the same as their initial states.

Example 8

In Example 8, the transfer sheet the same as that used in Example 5 was used, and ink image was transferred to the transfer sheet under the condition the same as that of Example 5.

Then, another lamination sheet was prepared. The other lamination sheet included a base, a releasable layer formed on the base and a coloring type hot melting type adhesive layer formed on the releasable layer. The coloring type hot melting type adhesive layer had a thickness of 50 micron meters and was made of polyolefin resin dispersed with coloring material therein. The coloring material was formed of phosphorescent material such as "LC-G1A" produced by "SINLOIHI Co.,Ltd.". The LC-G1A is a ZnS generating green luminous light and has particle size of 14 micron meters.

The thus prepared other lamination sheet was laminated with the imaging surface of the transfer sheet with the coloring type hot melting type adhesive layer facing the imaging surface. Then, hot stamping was carried out at a temperature of 150° C., pressure of 150 g/cm$^2$ for 15 seconds, so that the coloring type hot melting type adhesive layer was bonded to the image surface of the transfer sheet. Then, the base as well as the releasable layer of the other lamination sheet were removed from the coloring type hot melting type adhesive layer.

Next, the transfer sheet provided with the coloring type hot melting type adhesive layer was placed on a handkerchief of 100% cotton, and hot stamping was again carried out under the condition of temperature of 150° C., pressure 150 g/cm$^2$, and stamping period of 15 seconds. Thus formed print image on the handkerchief had a high quality without blot, blur, collapse, and the like. Further, the print image showed a good appearance with brightness, and provided a good touch feeling without incompatible sense. Moreover, since the phosphorescent fluorescent material was contained within the hot melting type adhesive layer, resultant printed image was visible because of its luminous light even at the dark location.

The print image on the T-shirt was tested on fastness against washing, abrasion, sweat, dry-cleaning, and light beam, and amount of free formaldehyde by Japan Synthetic Textile Inspection Institute Foundation (JSTIIF).

The test provided extremely desirable result as follows:

Washing Fastness Color fade: 5th grade
  contamination: 5th grade

Light Beam Fastness not less than 4th grade

Sweat Fastness Acid Color fade: 5th grade
  Contamination: 5th grade
  Alkali Color fade: 5th grade
  Contamination: 5th grade Abrasion Fastness Dry state: 5th grade
  Wet state: 5th grade Dry Cleaning Fastness Color fade: 5th grade
  Contamination: 5th grade Amount of Free formaldehyde: not more than 0.05

The transfer sheet was subjected to a preservation test under the conditions at temperature of 55° C. for 24 hours; temperature of 35° C. humidity of 80% for 48 hours; and temperature of –20° C. for 24 hours. The test samples exhibited final states the same as their initial states.

Example 9

A print sheet was prepared in a tape writer in a manner the same as Example 6, and another lamination sheet was laminated with the print sheet within a ribbon cassette in the manner the same as that of Example 6. The other lamination sheet included, as shown in FIG. 11, a base 53, a releasable layer 52 formed on the base 52, a hot melting type adhesive layer 32A formed of ethylene-vinyl acetate copolymer formed on the releasable layer 52 a coloring layer 33 formed on the ethylene-vinyl acetate copolymer layer 32A, and a viscous layer 51. Within the ribbon cassette of the tape writer, the viscous layer was bonded to the imaging surface 21 of the print sheet 20A to provide an integral print laminated sheet 50A. With the arrangement, the image section 21 was laminatedly interposed between the ethylenevinyl acetate copolymer layer 14 of the print sheet 20A and the coloring layer 33 formed on the ethylene-vinyl acetate copolymer layer 32A of the other lamination sheet. Details of the coloring layer was as follows:

ethylene methacrylic acid copolymer: 4 parts by weight (DuPont-Mitsui Polychemicals Co.,Ltd "NUCREL 599"

melting point: 94° C.,

Melt Index: 500 dg/min microcapsule encapsulating cholesteric liquid crystal: 1 part by weight.

discoloration temperature: 30° C.

color change pattern: red to green to blue coloring temperature range: within about 2.5° C.

Next, the transferable print laminate sheet 50A was placed on a T-shirt of 100% cotton, and hot stamping was carried out under the condition of temperature of 130° C., pressure 200 g/cm$^2$, and stamping period of 10 seconds. Thus formed print image on the T-shirt had a high quality without blot, blur, collapse, and the like. Further, the print image showed a good appearance with brightness, and provided a good touch feeling without incompatible sense. Furthermore, since heat sensitive material was used as a material of the coloring layer 33, the printed image could change its color in accordance with the temperature change. Accordingly, impressive print image was obtainable.

The print image on the T-shirt was tested on fastness against washing, abrasion, sweat, dry-cleaning, and light beam, and amount of free formaldehyde by Japan Synthetic Textile Inspection Institute Foundation (JSTIIF).

The test provided extremely desirable result as follows:

Washing Fastness Color fade: 5th grade
Contamination: 5th grade

Light Beam Fastness not less than 4th grade

Sweat Fastness Acid Color fade: 5th grade
Contamination: 5th grade
Alkali Color fade: 5th grade
Contamination: 5th grade Abrasion Fastness Dry state: 5th grade
Wet state: 5th grade Dry Cleaning Fastness Color fade: 2nd grade
Contamination: 5th grade Amount of Free formaldehyde: not more than 0.05

The transfer sheet was subjected to a preservation test under the conditions at temperature of 55° C. for 24 hours; temperature of 35° C. humidity of 80% for 48 hours; and temperature of −20° C. for 24 hours. The test samples exhibited final states the same as their initial states.

Example 10

Examples 10 through 12 pertain to the fourth embodiment of the present invention. In the Example 10, retransferred printed image was formed on a T-shirt in a manner the same as Example 1. Then, a commercially available yellow brushy sheet (See FIG. 14) was thermally laminated by hot stamping onto the retransferred image section on the T-shirt. The brushy sheet was manufactured by Horai Co.,Ltd, as a trade name "Isso Flock Sheet". The brushy sheet included the brushy layer 43, the brushy layer retaining layer 151 and the base 152 as described above. The hot stamping was carried out at the temperature of 150° C., pressure of 200 g/cm$^2$ for 10 seconds.

Thus formed print image with the brushy layer 43 on the T-shirt had a high quality without blot, blur, collapse, and the like. Further, the print image showed a good appearance with brightness, and provided a good touch feeling without incompatible sense.

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 11

In the Example 11, retransferred printed image was formed on a T-shirt in a manner the same as Example 9. Then, a commercially available green brushy sheet (See FIG. 14) was thermally laminated by hot stamping onto the retransferred image section on the T-shirt. The brushy sheet was manufactured by Horai Co.,Ltd, as a trade name "Isso Flock Sheet". The hot stamping was carried out at the temperature of 140° C., pressure of 150 g/cm$^2$ for 15 seconds.

Thus formed print image with the brushy layer 43 on the T-shirt had a high quality without blot, blur, collapse, and the like. Further, the print image showed a good appearance with brightness, and provided a good touch feeling without incompatible sense.

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 12

In the Example 12 retransferred printed image was formed on a T-shirt in a manner the same as Example 7. Then, a commercially available red brushy sheet (See FIG. 14) was thermally laminated by hot stamping onto the retransferred image section on the T-shirt. The brushy sheet was manufactured by Horai Co.,Ltd, as a trade name "Isso Flock Sheet". The hot stamping was carried out at the temperature of 130° C., pressure of 200 g/cm$^2$ for 10 seconds.

Thus formed print image with the brushy layer 43 on the T-shirt had a high quality without blot, blur, collapse, and the like. Further, the print image showed a good appearance with brightness, and provided a good touch feeling without incompatible sense.

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 13

Examples 13 through 15 pertains to the fifth embodiment of the present invention. In Example 13, the commercially available brushy sheet used in Example 10 through 12 was prepared. Then, the brushy transferable sheet 10A was prepared by coating a hot melting type adhesive layer 14 over the brushy layer 43A of the brushy sheet. The hot melting type adhesive layer was formed of polyamide resin having a thickness of 30 micron meters. Then, an ink image 21 (See FIG. 15) was transferred onto the polyamide resin layer by a heat-sensitive image transfer type tape writer (P-touch manufactured by Brother Kogyo K.K.) at ambient temperature of 10° C. to 35° C. Thus formed ink image was extremely clear and fine.

Next, the thus formed brushy print laminated sheet was placed on a T-shirt of 100% cotton, and hot stamping was carried out under the condition of temperature of 150° C., pressure 200 g/cm$^2$, and stamping period of 10 seconds. Thus formed brushy print image 42A (FIG. 12) on the T-shirt had a high quality without blot, blur, collapse, and the like. Further, the print image showed a good appearance with brightness, and provided a good touch feeling without incompatible sense.

The brushy print laminate sheet was subjected to a preservation test under the conditions at temperature of 55° C. for 24 hours; temperature of 35° C., humidity of 80% for 48 hours; and temperature of –20° C. for 24 hours. The test samples exhibited final states the same as their initial states.

Example 14

In Example 14, the commercially available brushy sheet used in Example 10 through 12 was prepared. Then, the brushy transferable sheet was prepared by coating a hot melting type adhesive layer 14 over the brushy layer 43A of the brushy sheet. The hot melting type adhesive layer was formed of ethylene-vinyl acetate copolymer and having a thickness of 30 micron meters. Then, an ink image 21 was transferred onto the Copolymer layer by a heat-sensitive image transfer type tape writer (P-touch manufactured by Brother Kogyo K.K.) at ambient temperature of 10° C. to 35° C. Thus formed ink image was extremely clear and fine.

The image surface of the thus prepared brushy print sheet 20B was laminated with a ethylene-vinyl acetate copolymer layer (other hot melting type adhesive layer 32) of another lamination sheet(which consists of a viscous layer 251, a coloring layer 33, the layer 32, the releasable layer 252 and the base 253 those shown in FIG. 18) within a ribbon cassette of the take writer. The coloring layer 33 was made of the material the same as that used in Example 7. Therefore, the transferable brushy print laminate sheet 250 shown in FIG. 18 was obtained. As described above, the print sheet 20B is bonded to the other laminate sheet by means of the viscous layer 251.

Next, the transferable brushy print laminate sheet 250 was placed on a handkerchief of 100% cotton, and hot stamping was carried out under the condition of temperature of 130° C., pressure 200 g/cm$^2$, and stamping period of 10 seconds. Thus formed print image on the handkerchief had a high quality without blot, blur, collapse, and the like. Further, the print image showed a good appearance with brightness, and provided a good touch feeling without incompatible sense.

The transferable brushy print laminated sheet 250 was subjected to a preservation test under the conditions at temperature of 55° C. for 24 hours; temperature of 35° C., humidity of 80% for 48 hours; and temperature of –20° C. for 24 hours. The test samples exhibited final states the same as their initial states.

Example 15

In Example 15, the commercially available brushy sheet used in Example 10 through 12 was prepared. Then, the brushy transferable sheet was prepared by coating a hot melting type adhesive layer 14 over the brushy layer 43A of the brushy sheet. The hot melting type adhesive layer was formed of ethylene-vinyl acetate-polyurethane resin and having a thickness of 20 micron meters. Then, an ink image 21 was transferred onto the resin layer by a heat-sensitive image transfer type tape writer (P-touch manufactured by Brother Kogyo K.K.) at ambient temperature of 10° C. to 35° C. Thus formed ink image was extremely clear and fine.

Next, another transfer sheet 260 (FIG. 19) was prepared. The other transfer sheet 260 included a base 261, a releasable layer 262 formed on the base 261, a coloring layer 33 formed on the releasable layer 262 and another hot melting type adhesive layer 32 formed on the coloring layer 33. The other hot melting type adhesive layer 32 was formed of ethylene-vinyl acetate-polyurethane resin, and the coloring layer was formed of a material the same as the coloring material of Example 7.

The other transfer sheet 260 was placed on a T-shirt of 100% cotton in such a manner that the ethylene vinyl acetate-polyurethane resin layer faced the T-shirt. Then, hot stamping was carried out under the condition of temperature of 180° C., pressure 200 g/cm$^2$, and stamping period of 10 seconds. Thereafter the base and the releasable layer were removed from the coloring layer 33. Thus, the coloring layer 33 and the resin layer 32 were formed over the T-shirt.

The image surface of the thus prepared brushy print sheet 20B was laminated with the coloring layer 33 on the ethylene vinyl acetate-polyurethane resin layer formed on the T-shirt by additional hot stamping under the condition of temperature of 180° C., pressure 200 g/cm$^2$, and stamping period of 10 seconds. Thus formed brushy and colored print image on the T-shirt had a high quality without blot, blur, collapse, and the like. Further, the print image showed a good appearance with brightness, and provided a good touch feeling without incompatible sense.

The transferable brushy print laminated sheet was subjected to a preservation test under the conditions at temperature of 55° C. for 24 hours; temperature of 35° C., humidity of 80% for 48 hours; and temperature of –20° C. for 24 hours. The test samples exhibited final states the same as their initial states.

Example 16

Examples 16 and 17 pertain to the sixth embodiment of this invention. In Example 16, a decorative transfer sheet 310 was prepared. The decorative transfer sheet 310 included a base 314, a releasable layer 314 formed on the base 313, a decorative layer 312 formed on the releasable layer 313 and a hot melting type adhesive layer 311 formed on the decorative layer 312. The decorative layer 312 was in the form of a silver colored metallic foil formed by vapor deposition of aluminum. The adhesive layer 311 was formed of ethylene vinyl acetate-polyurethane resin and having a thickness of 20 micron meters. The decorative sheet 310 was placed on the T-shirt of 100% cotton and hot stamping was carried out with the adhesive layer 311 facing the T-shirt under the condition of temperature of 180° C., pressure 200 g/cm$^2$, and stamping period of 10 seconds. Thereafter, the base 314 and the releasable layer 313 were removed, to thereby expose the metallic foil coloring layer 312.

Next, an ink image was thermosensitively transferred on a transfer sheet which included a glassine paper (base substrate) provided with a ethylene vinyl acetate-polyurethane resin layer of thickness 20 micron meters through a releasable layer of silicone by a heat-sensitive image transfer type tape writer (P-touch manufactured by Brother Kogyo K.K.) at ambient temperature of 10° C. to 35° C. Thus formed ink image was extremely clear and fine.

The image surface 21 of the print sheet 20 was placed on the decorative layer 312 on the T-shirt, and hot stamping was carried out under the condition of temperature of 180° C., pressure 200 g/cm$^2$, and stamping period of 10 seconds Thus formed brushy and colored print image 42B on the T-shirt had a high quality without blot, blur, collapse, and the like. Further, the print image showed a good appearance with brightness, and provided a good touch feeling without incompatible sense. Further, since the metallic foil layer was used, the retransferred image was able to be easily acknowledged even if the receiving member 30 (T-shirt) had dark color of black and dark blue.

The print image on the T-shirt was tested on fastness against washing, abrasion, sweat, dry-cleaning, and light beam, and amount of free formaldehyde. As a result, excellent test data were provided.

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 17

A decorative transfer sheet 310 was prepared. The decorative transfer sheet 310 included a base 314, a releasable layer 314 formed on the base 313, a decorative layer 312 formed on the releasable layer 313 and a hot melting type adhesive layer 311 formed on the decorative layer 312. The decorative layer 312 was formed of a metallic foil printed with a pattern. The adhesive layer 311 was formed of polyamide and having a thickness of 30 micron meters. The decorative sheet 310 was placed on the handkerchief of 100% cotton and hot stamping was carried out with the adhesive layer 311 facing the handkerchief under the condition of temperature of 150° C., pressure 150 g/cm$^2$, and stamping period of 15 seconds. Thereafter, the base 314 and the releasable layer 313 were removed, to thereby expose the metallic foil coloring layer 312.

Next, an ink image was thermosensitively transferred on a transfer sheet which included a glassine paper (base substrate) provided with a polyamide layer of thickness 30 micron meters through a releasable layer of silicone by a heat-sensitive image transfer type tape writer (P-touch manufactured by Brother Kogyo K.K.) at ambient temperature of 10° C. to 35° C. Thus formed ink image was extremely clear and fine.

The image surface 21 of the print sheet 20 was placed on the metallic foil layer 312 formed on the handkerchief, and hot stamping was carried out under the condition of temperature of 150° C., pressure 150 g/cm$^2$, and stamping period of 15 seconds. Thus formed print image 42B on the handkerchief had a high quality without blot, blur, collapse, and the like, and provided a good appearance with brightness and good touch feeling without incompatible sense.

The print image on the handkerchief was tested on fastness against washing, abrasion, sweat, dry-cleaning, and light beam, and amount of free formaldehyde. As a result, excellent test data were provided.

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 18

Examples 18 and 19 relate to the seventh embodiment of this invention. In Example 18, a laminated hot melting type adhesive sheet 310*a* (FIG. 26) was prepared. The sheet 310*a* included a base 314*a* releasable layer 313*a*, and a hot melting type adhesive layer 311*a* formed of ethylene vinyl acetate-polyurethane resin and having a thickness of 20 micron meters. The thus prepared adhesive sheet 310*a* was placed on the T-shirt of 100% cotton, and hot stamping was carried out under the condition of temperature of 180° C., pressure 200 g/cm$^2$, and stamping period of 10 seconds. Then, the releasable layer 313*a* and the base 314*a* were removed. Thus, the ethylene vinyl acetate-polyurethane resin layer 311*a* was formed on the T-shirt as shown in FIG. 25.

Then, a decorative layer transfer sheet 380 (FIG. 27) was prepared. The decorative sheet 380 contained a metallic foil 312*a* of gold color. This transfer sheet was manufactured by Horai Co., Ltd as a trade name of "gold metallic roll #2411 #2421". The metallic foil layer 312*a* of the decorative layer transfer sheet 380 was placed on the ethylene vinyl acetate-polyurethane resin layer 311*a*, and hot stamping was carried out at a condition the same as the first hot stamping.

Thereafter, an ink image was formed on a transfer sheet 10 in a manner similar to the Example 16. The imaging surface 21 of the transfer sheet 10 was then placed on the metallic foil layer 312*a* formed on the adhesive layer 311*a* on the T-shirt, and hot stamping was carried out under the condition of temperature of 180° C., pressure 200 g/cm$^2$, and stamping period of 10 seconds. Thus formed print image 42C on the T-shirt had a high quality without blot, blur, collapse, and the like, and provided a good appearance with brightness and good touch feeling without incompatible sense. Further, since the metallic foil was used, retransferred print image was visible even if the T-shirt had a dark color of black or dark blue.

The print image on the T-shirt was tested on fastness against washing, abrasion, sweat, dry-cleaning, and light beam, and amount of free formaldehyde. As a result, excellent test data were provided.

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 19

In Example 19, a laminated hot melting type adhesive sheet 310*a* (FIG. 26) was prepared. The sheet 310*a* included a base 314*a*, a releasable layer 313*a*, and a hot melting type adhesive layer 311*a* formed of polyamide and having a thickness of 30 micron meters. The thus prepared adhesive sheet 310*a* was placed on the handkerchief of 100% cotton, and hot stamping was carried out under the condition of temperature of 150° C., pressure 150 g/cm$^2$, and stamping period of 15 seconds. Then, the releasable layer 313*a* and the base 314*a* were removed. Thus, the polyamide layer 311*a* was formed on the handkerchief as shown in FIG. 25.

Then, a decorative layer transfer sheet 380 (FIG. 27) was prepared. The decorative sheet 380 contained a metallic foil 312*a* printed with a pattern. The metallic foil layer 312*a* of the decorative layer transfer sheet 380 was placed on the polyamide layer 311*a*, and hot stamping was carried out at a condition the same as the first hot stamping.

Next, an ink image was thermosensitively transferred on a transfer sheet which included a glassine paper (base substrate) provided with a polyamide layer of thickness 30 micron meters through a releasable layer of silicone by a heat-sensitive image transfer type tape writer (P-touch manufactured by Brother Kogyo K.K.) at ambient temperature of 10° C. to 35° C. Thus formed ink image was extremely clear and fine.

Then, the image surface of the transfer sheet was placed on the metallic foil layer 312*a* formed on the polyamide layer 311*a* on the handkerchief, and hot stamping was carried out under the condition of temperature of 150° C., pressure 150 g/cm$^2$, and stamping period of 15 seconds. Thus formed print image 42C on the handkerchief had a high quality without blot, blur, collapse, and the like, and provided a good appearance with brightness and good touch feeling without incompatible sense.

The print image on the handkerchief was tested on fastness against washing, abrasion, sweat, dry-cleaning, and light beam, and amount of free formaldehyde. As a result, excellent test data were provided.

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 20

Examples 20 and 21 concern the eighth embodiment of this invention.

An ink image was thermosensitively transferred on a transfer sheet which includes a glassine paper (base substrate) provided with a ethylene-vinyl acetate-polyurethane resin layer (hot melting type adhesive layer) having thickness of 20 micron meters through a releasable layer of silicone by a heat-sensitive image transfer type tape writer 790 shown in FIGS. 46 and 47 (P-touch manufactured by Brother Kogyo K.K.) at ambient temperature of 10° C. to 35° C. Thus formed ink image was extremely clear and fine.

The image surface of the thus prepared print sheet was laminated with a decorative transfer sheet 431 (FIG. 31) within a cartridge 770 of the tape writer 790, and the thus laminated print sheet 430 was discharged from the cassette 770. The decorative transfer sheet 431 included a base 432, a releasable layer 433 formed on the base 432, a hot melting type adhesive layer 435 formed on the releasable layer 433, a decorative layer 435 formed on the adhesive layer 434, and a viscous layer 436 formed on the decorative layer 435. The hot melting,type adhesive layer 434 was formed of ethylene vinyl acetate-polyurethane resin layer and had a thickness of 20 micron meters. The decorative layer was formed of silver colored metallic foil produced by vapor deposition of aluminum.

The base 432 together with the releasable layer 433 were removed from the resultant laminated print sheet 430, and the exposed hot melting type adhesive layer 434 was placed on a T-shirt of 100% cotton. Then hot stamping was carried out under the condition of temperature of 180° C., pressure 200 g/cm$^2$, and stamping period of 10 seconds. Then, the top base substrate 12 together with the releasable layer 13 were removed from the hot melting type adhesive layer 14. As a result, on the T-shirt, bonded was a lamination of the hot melting type adhesive layer 434, the metallic foil layer 435, the viscous layer 435, the image layer 21 and the hot melting type adhesive layer 14. Thus formed print image on the T-shirt had a high quality without blot, blur, collapse, and the like. Further, the print image showed a good appearance with brightness, and provided a good touch feeling without incompatible sense. Moreover, since the metallic foil layer was provided, the print image was still visible even of the T-shirt had a dark color of black or dark blue.

The print image on the T-shirt was tested on fastness against washing, abrasion, sweat, dry-cleaning, and light beam, and amount of free formaldehyde. The test provided extremely desirable result.

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 21

An ink image was thermosensitively transferred on a transfer sheet which includes a glassine paper (base substrate) provided with a polyamide layer (hot melting type adhesive layer) having thickness of 30 micron meters through a releasable layer of silicone by a heat-sensitive image transfer type tape writer 790 shown in FIGS. 46 and 47 (P-touch manufactured by Brother Kogyo K.K.) at ambient temperature of 10° C. to 35° C. Thus formed ink image was extremely clear and fine.

The image surface of the thus prepared print sheet was laminated with a decorative transfer sheet 431 (FIG. 31) within a cartridge 770 of the tape writer 790, and the thus laminated print sheet 430 was discharged from the cassette 770. The decorative transfer sheet 431 included laminated layers the same as those of Example 20 except that the hot melting type adhesive layer 434 was formed of polyamide and having a thickness of 30 micron meters, and the decorative layer 435 was formed of a metallic foil printed with a pattern.

The base 432 together with the releasable layer 433 were removed from the resultant laminated print sheet 430, and the exposed hot melting type adhesive layer 434 was placed on a handkerchief of 100% cotton. Then hot stamping was carried out under the condition of temperature of 150° C., pressure 150 g/cm$^2$, and stamping period of 15 seconds. Then, the top base substrate 12 together with the releasable layer 13 were removed from the hot melting type adhesive layer 14. As a result, on the handkerchief, bonded was a lamination of the hot melting type adhesive layer 434, the metallic foil layer 435, the viscous layer 435, the image layer 21 and the hot melting type adhesive layer 14. Thus formed print image on the handkerchief had a high quality without blot, blur, collapse, and the like. Further, the print image showed a good appearance with brightness, and provided a good touch feeling without incompatible sense.

The print image on the handkerchief was tested on fastness against washing, abrasion, sweat, dry-cleaning, and light beam, and amount of free formaldehyde. The test provided extremely desirable result.

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 22

Example 22 concerns the ninth embodiment of the present invention. First, a transfer sheet 520*a* (FIG. 34) was prepared. The transfer sheet included a base substrate 12 formed of a polyester film, a releasable layer 31 formed on the base substrate 12, a reflective layer 516 formed on the releasable layer 13 and containing glass beads having grain size of about 30 microns, and a hot melting type adhesive layer 514 formed on the reflective layer 516. The hot melting type adhesive layer was formed of ethylene vinyl acetate copolymer and having a thickness of 30 micron meters. Then an ink image was thermosensitively transferred on the hot melting type adhesive layer 514 by a heat-sensitive image transfer type tape writer (P-touch manufactured by Brother Kogyo K.K.) at ambient temperature of 10° C. to 35° C. Thus formed ink image was extremely clear and fine.

The image section of the transfer sheet was placed on a handkerchief of 100% cotton. Then hot stamping was carried out under the condition of temperature of 130° C., pressure 200 g/cm$^2$, and stamping period of 10 seconds. Then, the top base substrate 12 together with the releasable layer 13 were removed from the reflective layer 516. As a result, on the handkerchief, bonded was a lamination of the image layer 21, the hot,melting type adhesive layer 514, and the reflective layer 516. Thus formed print image on the handkerchief had a high quality without blot, blur, collapse, and the like. Further, the print image showed a good appearance with brightness, and provided a good touch feeling without incompatible sense.

The transfer sheet 520*a* was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 23

Example 23 pertains to the tenth embodiment of this invention. An ink image was thermosensitively transferred on a transfer sheet which includes a glassine paper (base substrate) provided with a polyamide layer (hot melting type adhesive layer) having thickness of 30 micron meters through a releasable layer of silicone by a heat-sensitive image transfer type tape writer (P-touch manufactured by Brother Kogyo K.K.) at ambient temperature of 10° C. to 35° C. Thus formed ink image 21 was extremely clear and fine.

Then, the image surface 21 was placed on a T-shirt of 100% cotton, and hot stamping was carried out under the condition of temperature of 150° C., pressure 200 g/cm$^2$, and stamping period of 10 seconds. Then, the top base substrate 12 together with the releasable layer 13 were removed from the hot melting type adhesive layer. As a result, on the T-shirt, the hot melting type adhesive layer 14 and the ink image layer 21 were bonded as shown in FIG. 40.

Next, a transfer sheet 520 (FIG. 40) was placed on the printed image on the T-shirt. The transfer sheet 520 included the base 12 formed of polyester film, a releasable layer 13 and a reflective layer 516 formed of glass beads having particle size of about 30 microns. Then hot stamping was carried out under the condition of temperature of 150° C., pressure 200 g/cm$^2$, and stamping period of 10 seconds. Then, the top base substrate 12 together with the releasable layer 13 were removed from the reflective layer 516. As a result, on the T-shirt, bonded was a lamination of the image layer 21, the hot melting type adhesive layer 14 and the reflective layer 516. Thus formed print image on the T-shirt had a high quality without blot, blur, collapse, and the like. Further, the print image showed a good appearance with brightness, and provided a good touch feeling without incompatible sense.

The transfer sheet was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 24

The following Examples 24 through 26 relate to the eleventh embodiment of the present invention. In Example 24, a transfer sheet (10B in FIG. 41) was prepared. The transfer sheet included a glassine paper (base substrate), a silicone releasable layer formed on the base substrate, a hot melting type adhesive layer formed on the releasable layer and dispersed with a red pigment, and a mesh sheet 615. The hot melting type adhesive layer was formed of a ethylene vinyl acetate copolymer and had a thickness of 30 micron meters. The mesh sheet 615 included a meshed base 616 formed on the hot melting type adhesive layer and formed of a polyester having a thickness of 50 micron meters, and a thermoplastic layer 617 formed of a polyester having a thickness of 4.5 micron meters.

Then, a heat transfer latent image was provided on the side of the mesh sheet 615 by forming holes 21A at the thermoplastic layer 617 by using a heat-sensitive image transfer type tape writer (P-touch manufactured by Brother Kogyo K.K.) at ambient temperature of 10° C. to 35° C. Thus formed latent image 21A was extremely clear and fine.

Then, the latent image surface 21A was placed on a handkerchief of 100% cotton, and hot stamping was carried out under the condition of temperature of 150° C., pressure 200 g/cm$^2$, and stamping period of 10 seconds Thus, only the image section corresponding to the latent image 21A was provided on the handkerchief.

Thus formed print image on the handkerchief had a high quality without blot, blur, collapse, and the like. Further, the print image showed a good appearance with brightness, and provided a good touch feeling without incompatible sense since only the image section was transferred onto the handkerchief.

The transfer sheet 10B was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 25

In Example 25, a transfer sheet the same as example 24 was prepared except that the ethylene vinyl acetate copolymer layer (14) was not dispersed with red pigment, and only the image section was transferred onto the handkerchief of 100% cotton in a manner the same as Example 24.

Then, a commercially available brushy sheet was prepared. The brushy sheet was produced by Horai Co,Ltd. as a trade name of "Isso Flock Sheet" as described above. The brushy sheet was placed on the image section on the handkerchief, and hot stamping was carried out under the condition of temperature of 150° C., pressure 200 g/cm$^2$, and stamping period of 10 seconds. Thereafter, the base together with the brushy layer retaining layer were removed from the brushy layer. Thus, the brushy layer was provided on the transferred image section on the handkerchief.

Thus formed brushy print image on the handkerchief had a high quality without blot, blur, collapse, and the like. Further, the print image showed a good appearance and provided a good touch feeling without incompatible sense since only the image section was transferred onto the handkerchief and since the brushy layer was formed over the image section.

The transfer sheet 10B was subjected to a preservation test under the conditions at temperature of 55° C. for 24 hours; temperature of 35° C., humidity of 80% for 48 hours; and temperature of −20° C. for 24 hours. The test samples exhibited final states the same as their initial states.

Example 26

In Example 26, a transfer sheet the same as example 24 was prepared except that the ethylene vinyl acetate-polyurethane layer (14) which is not dispersed with red pigment and which had a thickness of 20 micron meters was used instead of the ethylene vinyl acetate copolymer layer of Example 24. Only the image section was transferred onto the T-shirt of 100% cotton in a manner the same as Example 24.

Then, a commercially available decorative transfer sheet including a metallic foil was prepared. The sheet was produced by Horai Co,Ltd. as a trade name of "gold metallic roll #2411" as described above. The decorative transfer sheet was placed on the image section on the T-shirt, and hot stamping was carried out under the condition of temperature of 150° C., pressure 200 g/$cm^2$, and stamping period of 10 seconds. Thereafter, the base of the decorative transfer sheet was removed from the metallic foil layer. Thus, the decorative layer was provided on the transferred image section on the T-shirt.

Thus formed decorative print image on the T-shirt had a high quality without blot, blur, collapse, and the like. Further, the print image showed a good gloss appearance and provided a good brilliancy without incompatible sense since only the image section was transferred onto the handkerchief and since the decorative layer was formed over the image section.

As given described above, the printing method according to the present invention ensures that user can easily make the desired print image on the transfer sheet by using the heat-sensitive image transfer type recording device, and thus can reprint the print image formed on the transfer sheet on various receiving members at a low cost in a simple manner. Further, the printing method provides satisfactory effects that any desired letters and pictures can be freely arranged and easily printed on various materials in high quality print image. These advantages will contribute to industrial and home uses.

While the invention has been described in detail and with reference to specific embodiments thereof, it would be apparent to those skilled in the art that various changes and modifications may be made therein without departing from the spirit and scope of the invention.

What is claimed is:

1. A print sheet making device for making an image on an elongated image recording medium, the device comprising:

inputting means for inputting characters or marks to be printed on the image receiving member;

means for supplying the elongated image recording medium;

image forming means for forming an inked image of the characters or marks on the image recording medium in response to the inputting means, the elongated image recording medium comprising a base substrate, a releasable layer formed on the base substrate and a hot melting type adhesive layer formed on the releasable layer, the image forming means comprising; an ink ribbon, ink ribbon supplying means, ink ribbon taking up means, an ink ribbon path being provided between the ink ribbon supplying means and the ink ribbon taking up means, means for directing an elongated transfer sheet along the ink ribbon path, and a thermal head positioned along the ink ribbon path for thermally transferring ink of the ink ribbon to the elongated image recording medium in order to provide an ink image section thereon;

a second hot melting type adhesive sheet supplying means for supplying a second hot melting type adhesive sheet toward the elongated transfer sheet to which the ink image section has already been provided; and lamination means for laminating the second hot melting type adhesive sheet with the image section.

2. The print sheet making device as claimed in claim 1, wherein the second hot melting type adhesive sheet (431) comprises a decorative sheet.

3. A print sheet making device for making an image on an elongated image recording medium, the device comprising:

inputting means for inputting characters or marks to be printed on an image receiving member;

means for supplying the elongated image recording medium;

image forming means for forming a perforated latent image of the characters or marks on the image recording medium in response to the inputting means, the elongated image recording medium comprising a base substrate, a releasable layer formed on the base substrate and a hot melting type adhesive layer formed on the releasable layer; and wherein the elongated image recording medium further comprises a mesh sheet formed on the hot melting type adhesive layer, the mesh sheet comprising a mesh base formed on the hot melting type adhesive layer, and a thermoplastic resin layer formed on the mesh base.

4. The print sheet making device as claimed in claim 3, wherein the image forming means comprises;

a thermal head positioned contactable with the mesh sheet for thermally forming the perforated latent image in the thermoplastic resin layer.

5. A combination of a print sheet making device and a tape cartridge to be installed in the print sheet making device, the combination comprising;

the print sheet making device comprising an inputting means for inputting characters or marks to be printed on the image receiving member and for generating input signal;

means for driving the elongated image recording medium; and a thermal head for forming an image of the characters or marks on the image recording medium in response to the input signal in order to provide an ink image section thereon, the elongated image recording medium comprising a base substrate, a releasable layer formed on the base substrate and a hot melting type adhesive layer formed on the releasable layer; and the tape cartridge accommodating the elongated image recording medium to which an image is formed through the thermal head of the print sheet making device, the cartridge comprising:

a cartridge body having a recessed portion through which the thermal head can be positioned when installing the cartridge body into the print sheet making device;

means for supplying the elongated image recording medium rotatably supported on the cartridge body;

an ink ribbon supplying means rotatably supported on the cartridge body for supplying an ink ribbon;

an ink ribbon take-up means rotatably supported on the cartridge body for taking up the ink ribbon, an ink ribbon path being provided between the ink ribbon supplying means and the ink ribbon take-up means, and the recessed portion being positioned alongside the ink ribbon path; and means for directing the elongated image recording medium along the ink ribbon path, the hot melting type adhesive layer being positioned in confrontation with the ink ribbon.

6. The combination as claimed in claim 5, wherein the cartridge further comprises:

an elongated sheet supplying means for supplying an elongated sheet toward the elongated image recording medium whose hot melting type adhesive layer had already been provided with an ink image section; and lamination means for laminating the elongated sheet with the image section.

7. The combination as claimed in claim 6, wherein the elongated sheet comprises a decorative sheet.

* * * * *